(12) United States Patent
Dajani et al.

(10) Patent No.: US 11,405,491 B2
(45) Date of Patent: *Aug. 2, 2022

(54) SYSTEM AND METHOD FOR DATA TRANSFER, INCLUDING PROTOCOLS FOR USE IN REDUCING NETWORK LATENCY

(71) Applicant: Open Text SA ULC, Halifax (CA)

(72) Inventors: Aladin Dajani, Montreal (CA); Glen Matthews, Montreal (CA); Jonathan Carroll, Beaconsfield (CA); Chengxuan Guan, Pierrefonds (CA); Robert Wiktorczyk, Ville-Saint-Laurent (CA)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/128,496

(22) Filed: Dec. 21, 2020

(65) Prior Publication Data
US 2021/0152671 A1    May 20, 2021

Related U.S. Application Data

(63) Continuation of application No. 15/704,853, filed on Sep. 14, 2017, now Pat. No. 10,911,578, which is a
(Continued)

(51) Int. Cl.
*H04L 69/165* (2022.01)
*H04L 67/06* (2022.01)
(Continued)

(52) U.S. Cl.
CPC ........ *H04L 69/165* (2013.01); *H04L 41/0896* (2013.01); *H04L 47/196* (2013.01);
(Continued)

(58) Field of Classification Search
CPC ....... G06F 13/00; G06F 15/16; H04L 1/0002; H04L 7/10; H04L 12/24; H04L 12/801;
(Continued)

(56) References Cited

U.S. PATENT DOCUMENTS 4,569,042 A   2/1986 Larson
5,819,048 A   10/1998 Okazaki et al.
(Continued)

FOREIGN PATENT DOCUMENTS

EP   0522211   6/1991
EP   1280297   1/2003
(Continued)

OTHER PUBLICATIONS

European Search Report for Great Britain Application No. GB0418374.5, dated Jan. 7, 2005, 1 pg.
(Continued)

*Primary Examiner* — Tan Doan
(74) *Attorney, Agent, or Firm* — Sprinkle IP Law Group

(57) ABSTRACT

Embodiments of systems and methods for data transfer are presented herein. Specifically, embodiments of such a data transfer methodology may utilize one or more transmission channels for the transmission of the data to be transferred. In addition, a control channel in a different protocol than the transmission channels may be utilized to transmit control information between the sender and recipient. The rate at which data is sent on the transmission channels may be adjusted or the transmission of data on the transmission channel prioritized.

19 Claims, 12 Drawing Sheets

Related U.S. Application Data continuation of application No. 15/133,886, filed on Apr. 20, 2016, now Pat. No. 9,800,695, which is a continuation of application No. 13/863,635, filed on Apr. 16, 2013, now Pat. No. 9,614,937, which is a continuation of application No. 13/610,573, filed on Sep. 11, 2012, now Pat. No. 9,386,127.

(60) Provisional application No. 61/540,021, filed on Sep. 28, 2011.

(51) Int. Cl.
| | |
|---|---|
| *H04L 69/14* | (2022.01) |
| *H04L 69/164* | (2022.01) |
| *H04L 69/16* | (2022.01) |
| *H04L 41/0896* | (2022.01) |
| *H04L 47/19* | (2022.01) |

(52) U.S. Cl.
CPC .............. *H04L 67/06* (2013.01); *H04L 69/14* (2013.01); *H04L 69/16* (2013.01); *H04L 69/164* (2013.01)

(58) Field of Classification Search
CPC ..... H04L 29/06; H04L 29/08; H04L 29/0809; H04L 29/06027; H04L 29/08072; H04L 29/08117; H04L 29/08135; H04L 29/08144; H04L 41/0896; H04L 47/10; H04L 47/193; H04L 47/196; H04L 67/00; H04L 67/02; H04L 67/06; H04L 69/14; H04L 69/16; H04L 69/164; H04L 69/165
USPC .................................................. 709/217, 232
See application file for complete search history.

(56) References Cited

U.S. PATENT DOCUMENTS

| | | | |
|---|---|---|---|
| 5,974,496 | A | 10/1999 | Miller |
| 5,987,011 | A | 11/1999 | Toh |
| 6,012,096 | A | 1/2000 | Link et al. |
| 6,029,205 | A | 2/2000 | Alferness et al. |
| 6,061,722 | A | 5/2000 | Lipa et al. |
| 6,091,709 | A | 7/2000 | Harrison et al. |
| 6,246,684 | B1 | 6/2001 | Chapman et al. |
| 6,321,264 | B1 | 11/2001 | Fletcher et al. |
| 6,363,056 | B1 | 3/2002 | Beigi et al. |
| 6,535,553 | B1 | 3/2003 | Limberg et al. |
| 6,654,463 | B1 | 11/2003 | Leonidov et al. |
| 6,657,954 | B1 | 12/2003 | Bird et al. |
| 6,662,223 | B1 | 12/2003 | Zhang et al. |
| 6,687,247 | B1 | 2/2004 | Wilford et al. |
| 6,721,316 | B1 | 4/2004 | Epps et al. |
| 6,820,133 | B1 | 11/2004 | Grove et al. |
| 6,839,767 | B1 | 1/2005 | Davies et al. |
| 6,868,094 | B1 | 3/2005 | Bordonaro et al. |
| 6,904,286 | B1 | 6/2005 | Dantu |
| 6,993,578 | B1 | 1/2006 | Dmitroca |
| 7,020,719 | B1 | 3/2006 | Grove et al. |
| 7,072,356 | B1 | 7/2006 | Clancy et al. |
| 7,088,706 | B2 | 8/2006 | Zhang et al. |
| 7,151,764 | B1 | 12/2006 | Heinonen et al. |
| 7,239,630 | B1 | 7/2007 | Lim et al. |
| 7,243,163 | B1 | 7/2007 | Friend et al. |
| 7,260,640 | B1 | 8/2007 | Kramer et al. |
| 7,287,097 | B1 | 10/2007 | Friend et al. |
| 7,346,678 | B1 | 3/2008 | Zhu et al. |
| 7,360,075 | B2 | 4/2008 | VanHeyningen et al. |
| 7,415,652 | B1 | 8/2008 | Szeremi |
| 7,447,775 | B1 | 11/2008 | Zhu et al. |
| 7,551,623 | B1 | 6/2009 | Feroz et al. |
| 8,117,322 | B1 * | 2/2012 | McQuade ............... H04L 69/14 709/219 |
| 8,892,665 | B1 | 11/2014 | Rostami-Hesarsorkh et al. |
| 9,037,734 | B2 | 5/2015 | Kim et al. |
| 9,135,209 | B2 | 9/2015 | Park |
| 9,210,064 | B2 | 12/2015 | Sturrock et al. |
| 9,386,127 | B2 | 7/2016 | Dajani et al. |
| 9,614,937 | B2 | 4/2017 | Dajani et al. |
| 9,621,473 | B2 | 4/2017 | Copsey et al. |
| 9,800,695 | B2 | 10/2017 | Dajani et al. |
| 9,887,899 | B2 | 2/2018 | Sturrock et al. |
| 9,887,900 | B2 | 2/2018 | Sturrock et al. |
| 10,154,120 | B2 | 12/2018 | Dajani et al. |
| 10,277,495 | B2 | 4/2019 | Sturrock et al. |
| 10,298,659 | B2 | 5/2019 | Copsey et al. |
| 10,581,716 | B2 | 3/2020 | Sturrock et al. |
| 10,686,866 | B2 | 6/2020 | Copsey et al. |
| 10,911,578 | B2 | 2/2021 | Dajani et al. |
| 2001/0012288 | A1 | 8/2001 | Yu |
| 2002/0075895 | A1 | 6/2002 | Yamaguchi et al. |
| 2002/0112152 | A1 | 8/2002 | VanHeyningen et al. |
| 2002/0120727 | A1 | 8/2002 | Curley et al. |
| 2002/0145981 | A1 | 10/2002 | Klinker et al. |
| 2002/0177448 | A1 | 11/2002 | Moran et al. |
| 2003/0083870 | A1 | 5/2003 | Lee et al. |
| 2003/0112966 | A1 | 6/2003 | Halder et al. |
| 2003/0115321 | A1 | 6/2003 | Edmison et al. |
| 2003/0131128 | A1 | 7/2003 | Stanton |
| 2003/0156550 | A1 | 8/2003 | Burmeister et al. |
| 2003/0195976 | A1 | 10/2003 | Shiigi |
| 2003/0235244 | A1 | 12/2003 | Pessoa et al. |
| 2003/0235294 | A1 | 12/2003 | Dyba et al. |
| 2003/0235312 | A1 | 12/2003 | Pessoa et al. |
| 2004/0018851 | A1 | 1/2004 | Koenick et al. |
| 2004/0039938 | A1 | 2/2004 | Katz et al. |
| 2004/0052259 | A1 | 3/2004 | Garcia et al. |
| 2004/0063454 | A1 | 4/2004 | Sasaki |
| 2004/0145516 | A1 | 7/2004 | Large et al. |
| 2004/0160938 | A1 | 8/2004 | Lee |
| 2004/0162051 | A1 | 8/2004 | Elsey et al. |
| 2004/0184464 | A1 | 9/2004 | Holden |
| 2004/0184470 | A1 | 9/2004 | Holden |
| 2004/0199659 | A1 | 10/2004 | Ishikawa et al. |
| 2004/0203820 | A1 | 10/2004 | Billhartz |
| 2005/0005020 | A1 | 1/2005 | Rey et al. |
| 2005/0018703 | A1 | 1/2005 | Blasco Claret et al. |
| 2005/0021830 | A1 | 1/2005 | Urzaiz et al. |
| 2005/0063307 | A1 | 3/2005 | Samuels et al. |
| 2005/0071423 | A1 | 3/2005 | Rajaniemi |
| 2005/0101306 | A1 | 5/2005 | Zabawskyj et al. |
| 2005/0123003 | A1 | 6/2005 | Bordonaro et al. |
| 2005/0148314 | A1 | 7/2005 | Taglienti et al. |
| 2005/0254419 | A1 * | 11/2005 | Barker ................ H04L 47/2416 370/229 |
| 2006/0007882 | A1 | 1/2006 | Zeng et al. |
| 2006/0029037 | A1 | 2/2006 | Chen et al. |
| 2006/0104288 | A1 | 5/2006 | Yim et al. |
| 2006/0203855 | A1 | 9/2006 | Senta et al. |
| 2007/0081498 | A1 | 4/2007 | Niwano |
| 2007/0091498 | A1 | 4/2007 | Fujimori |
| 2007/0133418 | A1 | 6/2007 | Agarwal |
| 2008/0101598 | A1 | 5/2008 | Dillaway |
| 2008/0104598 | A1 | 5/2008 | Chang |
| 2008/0144660 | A1 | 6/2008 | Godlewski |
| 2008/0253387 | A1 | 10/2008 | Liang et al. |
| 2009/0028168 | A1 | 1/2009 | Somekh et al. |
| 2009/0049189 | A1 | 2/2009 | Zhu et al. |
| 2009/0241005 | A1 | 9/2009 | Hong et al. |
| 2010/0202451 | A1 | 8/2010 | Glover et al. |
| 2011/0069616 | A1 | 3/2011 | Revels |
| 2011/0113169 | A1 | 5/2011 | Maeng et al. |
| 2011/0267952 | A1 | 11/2011 | Ko et al. |
| 2012/0324046 | A1 | 12/2012 | Park |
| 2013/0246565 | A1 | 9/2013 | Froelicher et al. |
| 2014/0129893 | A1 | 5/2014 | Rigaudeau et al. |
| 2014/0201388 | A1 | 7/2014 | Dajani et al. |
| 2017/0163542 | A1 | 6/2017 | Dajani et al. |
| 2017/0163714 | A1 | 6/2017 | Copsey et al. |
| 2018/0027099 | A1 | 1/2018 | Dajani et al. |
| 2018/0097717 | A1 | 4/2018 | Sturrock et al. |

(56) References Cited

U.S. PATENT DOCUMENTS

| | | |
|---|---|---|
| 2019/0215260 A1 | 7/2019 | Sturrock et al. |
| 2019/0230150 A1 | 7/2019 | Copsey et al. |

FOREIGN PATENT DOCUMENTS

| | | |
|---|---|---|
| EP | 1480483 | 11/2004 |
| GB | 2394628 | 4/2004 |
| WO | WO0025487 | 5/2000 |
| WO | WO03053002 | 6/2003 |

OTHER PUBLICATIONS

Rejaie et al., RAP: An End-to end Rate-based Congestion Control Mechanism for Realtime Streams in the Internet, University of Southern California, Marina Del Rey, CA, Jul. 20, 1998, 27 pgs.

European Search Report for Great Britain Application No. GB05255074. 6, dated Feb. 28, 2006, 11 pgs.

Office Action for U.S. Appl. No. 10/929,029, dated Apr. 21, 2008, 9 pgs.

Office Action for U.S. Appl. No. 10/929,029, dated Nov. 19, 2008, 10 pgs.

Office Action for U.S. Appl. No. 10/929,029, dated Jun. 23, 2009, 9 pgs.

Office Action for U.S. Appl. No. 10/929,029, dated Feb. 2, 2010, 9 pgs.

Office Action for U.S. Appl. No. 10/929,029, dated Mar. 3, 2011, 9 pgs.

Office Action for U.S. Appl. No. 10/929,029, dated Aug. 30, 2011, 10 pgs.

Office Action for U.S. Appl. No. 10/929,029, dated Apr. 11, 2013, 10 pgs.

Office Action for U.S. Appl. No. 10/929,029, dated Dec. 2, 2013, 12 pgs.

Office Action for U.S. Appl. No. 13/610,573, dated May 2, 2014, 35 pgs.

Padhye et al., A Model Based TCP-Friendly Rate Control Protocol, Proceeding of NOSSDAV '99, Jun. 23, 1999, 15 pgs.

Office Action for U.S. Appl. No. 10/929,029, dated Jun. 4, 2014, 13 pgs.

Office Action for U.S. Appl. No. 13/610,573, dated Oct. 9, 2014, 38 pgs.

Xiao et al., A TCP-Friendly Congestion Control Mechanism Combined with the Routers, Proceedings of the Sixth Int'l Conf. on Machine Learning and Cybernetics, Aug. 19-22, 2007, IEEE, pp. 3223-3228.

Office Action for U.S. Appl. No. 13/737,793, dated May 5, 2015, 10 pgs.

Office Action for U.S. Appl. No. 13/860,364, dated May 6, 2015, 9 pgs.

Office Action for U.S. Appl. No. 13/610,573, dated Apr. 27, 2015, 30 pgs.

Office Action for U.S. Appl. No. 13/863,635, dated Jul. 14, 2015, 26 pgs.

Office Action for U.S. Appl. No. 13/610,573, dated Sep. 10, 2015, 30 pgs.

Office Action for U.S. Appl. No. 13/863,635, dated Nov. 5, 2015, 34 pgs.

Office Action for U.S. Appl. No. 13/737,793, dated Nov. 18, 2015, 13 pgs.

Office Action for U.S. Appl. No. 13/860,364, dated Nov. 18, 2015, 13 pgs.

Office Action for U.S. Appl. No. 14/070,157, dated Jan. 6, 2016, 14 pgs.

Office Action for U.S. Appl. No. 13/863,635, dated May 25, 2016, 34 pgs.

Office Action for U.S. Appl. No. 14/070,157, dated May 31, 2016, 17 pgs.

Office Action for U.S. Appl. No. 13/737,793, dated Sep. 27, 2016, 14 pgs.

Office Action for U.S. Appl. No. 13/860,364, dated Sep. 27, 2016, 13 pgs.

Office Action for U.S. Appl. No. 15/133,886, dated Oct. 27, 2016, 23 pgs.

Office Action for U.S. Appl. No. 13/737,793, dated May 5, 2017, 14 pgs.

Office Action for U.S. Appl. No. 13/860,364, dated May 5, 2017, 13 pgs.

Office Action for U.S. Appl. No. 15/442,427, dated Dec. 7, 2017, 28 pgs.

Office Action for U.S. Appl. No. 15/442,372, dated Feb. 14, 2018, 32 pgs.

Office Action for U.S. Appl. No. 15/831,786, dated Jun. 28, 2018, 21 pgs.

Office Action for U.S. Appl. No. 15/442,427, dated Jun. 26, 2018, 11 pgs.

Notice of Allowance for U.S. Appl. No. 15/442,372, dated Sep. 20, 2018, 7 pgs.

Office Action issued for U.S. Appl. No. 16/352,598, dated Jul. 9, 2019, 11 pages.

Office Action issued for U.S. Appl. No. 15/704,853, dated Aug. 27, 2019, 22 pages.

Office Action issued for U.S. Appl. No. 16/370,416, dated Sep. 17, 2019, 20 pgs.

Office Action for U.S. Appl. No. 15/704,853, dated Jan. 29, 2020, 17 pgs.

Office Action for U.S. Appl. No. 15/704,853, dated Jun. 3, 2020, 17 pgs.

Notice of Allowance for U.S. Appl. No. 15/704,853, dated Sep. 21, 2020, 8 pgs.

\* cited by examiner

SYSTEM AND METHOD FOR DATA TRANSFER, INCLUDING PROTOCOLS FOR USE IN REDUCING NETWORK LATENCY

RELATED APPLICATIONS

This patent application is a continuation of, and claims a benefit of priority under 35 U.S.C. 120 of the filing date of U.S. patent application Ser. No. 15/704,853, filed Sep. 14, 2017, entitled "System and Method for Data Transfer, Including Protocols for Use in Data Transfer," by inventors Aladin Dajani et al., issued as U.S. Pat. No. 10,911,578, which is a continuation of, and claims a benefit of priority under 35 U.S.C. 120 of the filing date of the filing date of U.S. patent application Ser. No. 15/133,886, filed Apr. 20, 2016, entitled "System and Method for Data Transfer, Including Protocols for Use in Data Transfer," by inventors Aladin Dajani et al., issued as U.S. Pat. No. 9,800,695, which is a continuation of, and claims a benefit of priority under 35 U.S.C. 120 of the filing date of U.S. patent application Ser. No. 13/863,635 filed Apr. 16, 2013, entitled "System and Method for Data Transfer, Including Protocols for Use in Data Transfer," by inventors Aladin Dajani et al., issued as U.S. Pat. No. 9,614,937, which is a continuation of, and claims a benefit of priority under 35 U.S.C. 120 of the filing date of U.S. patent application Ser. No. 13/610,573, filed Sep. 11, 2012, entitled "System and Method for Data Transfer, Including Protocols for Use in Data Transfer," by inventors Aladin Dajani et al., issued as U.S. Pat. No. 9,386,127, which claims the benefit of priority under 35 U.S.C. 119 to U.S. Provisional Patent Application Ser. No. 61/540,021, filed Sep. 28, 2011, entitled "System and Method for Data Transfer, Including Protocols for Use in Data Transfer," by inventors Aladin Dajani, Glen Matthews, Jonathan Carroll, Chengxuan Guan and Robert Wiktorczyk, the entire contents of which are hereby expressly incorporated by reference for all purposes.

TECHNICAL FIELD

This disclosure relates generally to systems and methods for data transfer. Specifically, this disclosure relates to systems and methods for the transfer of data in a networked environment and the reduction of the effects of network latency in such transfers. Additionally, this disclosure relates to protocols for use in the transfer of data in a network environment which may result in decreased transfer times.

BACKGROUND

With the increase of networked (both wired and wireless) and distributed computing environments (e.g., the Internet, mobile or cellular networks, office internets or intranets, etc.) the need to transfer data between computing devices has similarly increased. Commensurate with the increased need to transfer this data, the size of the data that it is desired to transfer has also increased. This combination has resulted in undesirable latency issues in the transfer of this data.

More specifically, as the distance of over which it is desired to transfer data increases, the latency of the file transfer may similarly increase due to increased network latency. This network latency may be due to a number of factors such as an increase in the number of hops required for the data transfer, a greater likelihood of network congestion on an intermediary networked, varying capacity on intermediary networks or a whole host of other factors.

To exacerbate the problem, the latency added by the distance of the transferred may be even more noticeable when large amount of data are transferred. For example, a 20 millisecond difference in the transfer speed of a packet may not be particularly noticeable when transferring a 2 MB file, however when transferring a 5 GB file such latency may be become quite problematic.

While certain solutions to address or reduce the effects of latency issue have been built for specific applications, these solutions usually require certain hardware components or rely on the compression of data. However, not all data is compressible and the installation of hardware modules at one or both ends of a network connection may not always be feasible.

Accordingly, it is desired to implement effective, reliable or general purpose solutions for reducing the effects of network latency in data transfers.

SUMMARY

Figure 1:
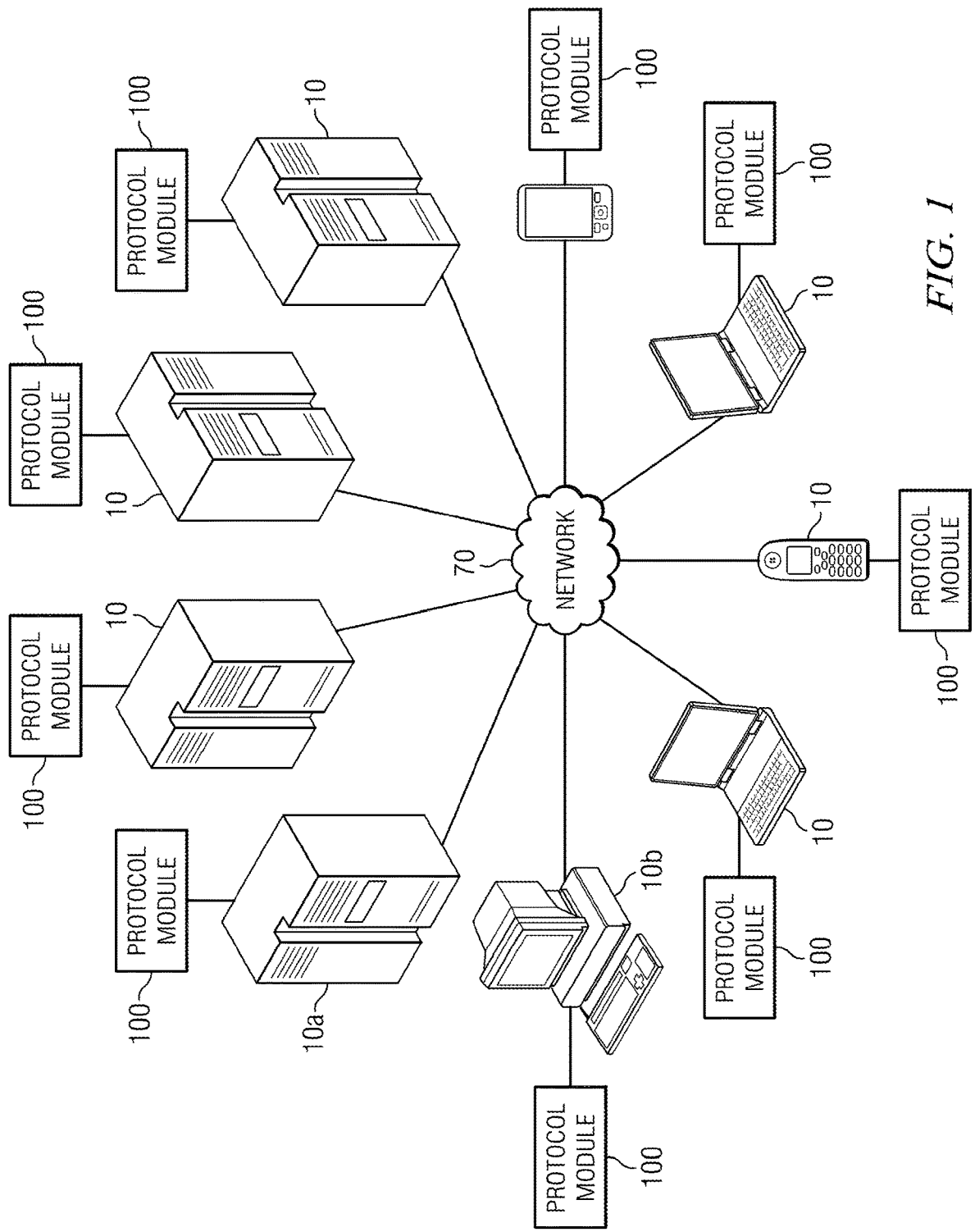
FIG. 1 is a block diagram illustrating one embodiment of an architecture that includes devices using a protocol module.

Embodiments of systems and methods for data transfer are presented herein. Specifically, embodiments of such a data transfer methodology may utilize one or more transmission channels for the transmission of the data to be transferred. In addition, a control channel in a different protocol than the transmission channels may be utilized to transmit control information between the sender and recipient. The rate at which data is sent on the transmission channels may be adjusted or the transmission of data on the transmission channel prioritized/reprioritized (collectively prioritized).

More specifically, in one embodiment a protocol may be implemented using a protocol module on each of a sender and a receiver device. The protocol module may emulate one or more interfaces provided by a protocol of a layer of a protocol stack. When an application or other sender on a sender device utilizes the emulated interface to send data the data is provided to the protocol module. The protocol module on the sender may establish a control channel with a corresponding protocol module on the intended recipient. Additionally, the protocol module may establish one or more transmission channels with the corresponding protocol module. The sender and recipient may communicate acknowledgements, statistics or other control data over the control channel. An adaptive control module may utilize the data on the control channel to adjust the transmission of data on the transmission channel.

Accordingly, embodiments as disclosed may receive data for transmission at a protocol module, establish a control channel in one protocol and a transmission channel in another protocol. The data can then be transmitted over the transmission channel, where the transmission of data over the transmission channel may be adjusted based on the control data received on the control channel.

In some embodiments, the protocol for the control channel may be an unreliable protocol such as UDP and the second protocol may be a reliable protocol such as TCP.

In certain embodiments, adjusting the transmission of data may comprise adjusting a send rate or prioritizing a set of packets of the data for transmission on the transmission channel. Prioritizing the set of packets of the data for transmission over the transmission channel may be done based on a retransmit time. The retransmit time may be determined, for example, based on a network round trip time determined using the control data received on the control channel.

Thus, embodiments may provide the advantage that the data transfers that approach the speed of data transfers using solely unreliable protocols may be approached while simultaneously guaranteeing the reliability or ordering of reliable protocols. Furthermore, senders and receivers with embodiments of such a protocol module can directly or indirectly access the software using standard socket interface and benefit from latency tolerance. Moreover, embodiments as disclosed may be able to take advantage of available network bandwidth and allow network losses and congestion to be accounted for. The use of data transfer on a transmission channel coupled with control logic that adjusts this transmission based on data received on a reliable control channel allows the protocol module to perform latency tolerant bulk data transfer while simultaneously taking advantage of reliable protocols on the control channel to guarantee delivery of such data.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Embodiments of the present invention can be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, etc.), or the like.

ROM, RAM, and HD are computer memories for storing computer-executable instructions executable by the CPU or capable of being compiled or interpreted to be executable by the CPU. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, or any other programming or scripting code. Other software/hardware/network architectures may be used. For example, the functions of the present invention may be implemented on one computer or shared among two or more computers. In one embodiment, the functions of the present invention may be distributed in the network. Communications between computers implementing embodiments of the invention can be accomplished using any electronic, optical, radio frequency signals, or other suitable methods and tools of communication in compliance with known network protocols.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols. It will be understood for purposes of this disclosure that a module is one or more computer processes, computing devices or both, configured to perform one or more functions. A module may present one or more interfaces which can be utilized to access these functions. Such interfaces include APIs, web services interfaces presented for a web services, remote procedure calls, remote method invocation, etc. For purposes of this disclosure, it will be understood that buffers, queues, lists as used herein to refer to a memory location which may or may not maintain some form of ordering and that these different terms are used herein interchangeably. It will also be understood for purposes of this disclosure that the terms packet or message are used herein interchangeably to refer to a transmission of data.

Before discussing specific embodiments a brief overview of the context of the disclosure may be helpful. As discussed above, the need to transfer data between computing devices over networks grows ever more important while the size of the data it is desired to transfer is increasing. This combination has resulted in the undesirable latency issues in the transfer of this data.

Most data transfer over these networks utilizes transmission control protocol (TCP). TCP provides reliable ordered delivery of data. Using TCP a receiver will send an acknowledgement (ACK) to the sender when a packet is received to indicate to the sender the reception of a packet and the sender may retransmit lost packets (e.g., in the event no ACK is received). Thus, TCP is optimized for accurate delivery rather than timely delivery, and therefore, the use of TCP in data transfers sometimes incurs relatively long delays while waiting for out-of-order packets or retransmissions of lost packets. Accordingly, the latency induced through the use of TCP may be undesirable in certain data transfer contexts, such as when streaming data (e.g., streaming audio or video, voice over IP, etc.) or in other contexts.

In order to reduce the effects of latency associated with the use of TCP to transfer data, user datagram protocol (UDP) has been used in certain cases. UDP uses a simple transmission model without implicit handshaking dialogues for providing reliability, ordering, or data integrity. Thus, UDP provides an unreliable service and packets may arrive out of order, appear duplicated, or go missing without notice. While advantageous for reducing latency, the out of order delivery and lack of reliability may make the use of UDP less than desirable in certain instances.

While solutions to reduce the effects of latency have been built for specific applications, these solutions have typically utilized certain hardware components or rely on the compression of data. However, not all data is compressible and the installation of hardware modules at one or both ends of a network connection may not always be feasible.

Accordingly, it is desired to implement a general purpose solution for accomplishing data transfers that has the advantages of both the ordering and reliability of TCP and the reduced effects of latency of UDP.

To that end, attention is now directed to the systems and methods for data transfer presented herein. Embodiments of such a data transfer methodology may utilize one or more transmission channels for the transport of the data to be transferred. In addition, a control channel in a different protocol than the transmission channels may be utilized to transmit control information between the sender and recipient. An adaptive control module may adjust the rate at which data is sent on the transmission channels or prioritize/reprioritize the transmission of data on the transmission channel.

More specifically, in one embodiment a protocol (embodiments of which may be referred to herein as the STORM protocol) may be implemented using a protocol module on each of a sender and a receiver device. The protocol module may emulate one or more interfaces provided by a protocol of a layer of a protocol stack, such as for example an interface provided by a protocol of a transport layer of a protocol stack (e.g., where the protocol stack adheres to the open systems interconnection (OSI) reference model, the TCP/IP protocol stack, or another type of protocol stack).

As such, when an application on a sender device utilizes the emulated interface to send data the application is actually providing data to the protocol module. When the application attempts to send data using the emulated interface, then, the protocol module on the sender may establish a control channel in the emulated protocol (or another type of protocol) with the corresponding protocol module on the intended recipient. Additionally, the protocol module may establish one or more transmission channels over which the data provided by the application using the emulated interface may be transmitted. These transmission channel(s) may utilize a protocol with less latency relative to the protocol utilized for the control channel. The sender and recipient may communicate acknowledgements, statistics or other control data over the control channel. An adaptive control module may utilize the data on the control channel to adjust the transmission of data on the transmission channel, including for example, adjusting the rate at which data is sent on the transmission channel(s) or prioritize/reprioritize (collectively prioritize) the transmission of data on the transmission channel(s).

In one embodiment, the transmission channel(s) may be UDP channel(s). Thus, data that was originally intended by the application to be transmitted in the emulated protocol may actually be transmitted using a UDP channel. Thus, data which was to be transmitted according to almost any protocol may be transmitted according to UDP with the commensurate benefits of transmission via that protocol. Additionally, by using the emulated (or another) protocol to establish a control channel, where the control channel protocol may be relatively more reliable than UDP, and using control information over that control channel to control the data rate on the transmission channel(s) or prioritize transmissions on the transmission channel, some benefits related to reliability, ordering, etc. may also be achieved. Such solutions may be self-contained in that they do not require replacement of operating system drivers, alteration to existing applications or installation of external hardware. Furthermore, such a protocol module may be distributed to a sender or receiver on demand (e.g., when needed) or can be pre-installed on certain systems.

FIG. 1 depicts one embodiment of an architecture including computer devices 10 (for example, mobile devices, smartphones, PDAs, desktop computers, laptops, workstations, fax devices, or any other device that include a processor) communicating over a network 70 which may be, for example, the Internet, an internet, an intranet, a LAN a WAN, an IP based network, etc. These devices 10 may include protocol module 100 which may be utilized to transfer data between the devices 10 over network 70.

More specifically, an application on one device 10a may wish to send data to an application on another device 10b. The application may utilize an interface presented by a protocol. Protocol module 100 on the sending device 10a may emulate one or more interfaces provided by the protocol.

As such, when the application on the sending device 10a utilizes the interface to the protocol to send data, the application is actually providing data to the protocol module 100 through the emulated interface provided by the protocol module 100.

When the application attempts to send data using the emulated interface, then, the protocol module 100 on the sender device 10a may determine the intended recipient device 10b and attempt to establish contact with the protocol module 100 on the intended recipient device 10b. If the intended recipient device 10b does not have protocol module 100 installed, the sender device 10a may transmit the protocol module 100 over the network 70 to the intended recipient 10b where it may be installed.

If the protocol module 100 is present on the intended recipient device 10b (or after the protocol module 100 has been installed on the intended recipient device 10b) the protocol module 100 on the sending device 10a may establish a control channel in the emulated protocol (or another type of protocol) with the corresponding protocol module 100 on the intended recipient 10b. Additionally, the protocol module 100 may establish one or more transmission channels over which the data provided by the application using the emulated interface may be transmitted over network 70. These transmission channel(s) may utilize a protocol with less latency relative to the protocol utilized for the control channel.

During transmission of the data from the sender device 10a to the intended recipient device 10b, protocol module 100 on the sender device 10a and protocol module 100 on the recipient device 10b may transmit the data over the network 70 over the transmission channel and control data over the network 70 over the control channel. An adaptive control module of the protocol module 100 may utilize the data on the control channel to adjust the rate at which data is sent on the transmission channel(s) or prioritize the transmission of data on the transmission channel(s).

Figure 2:
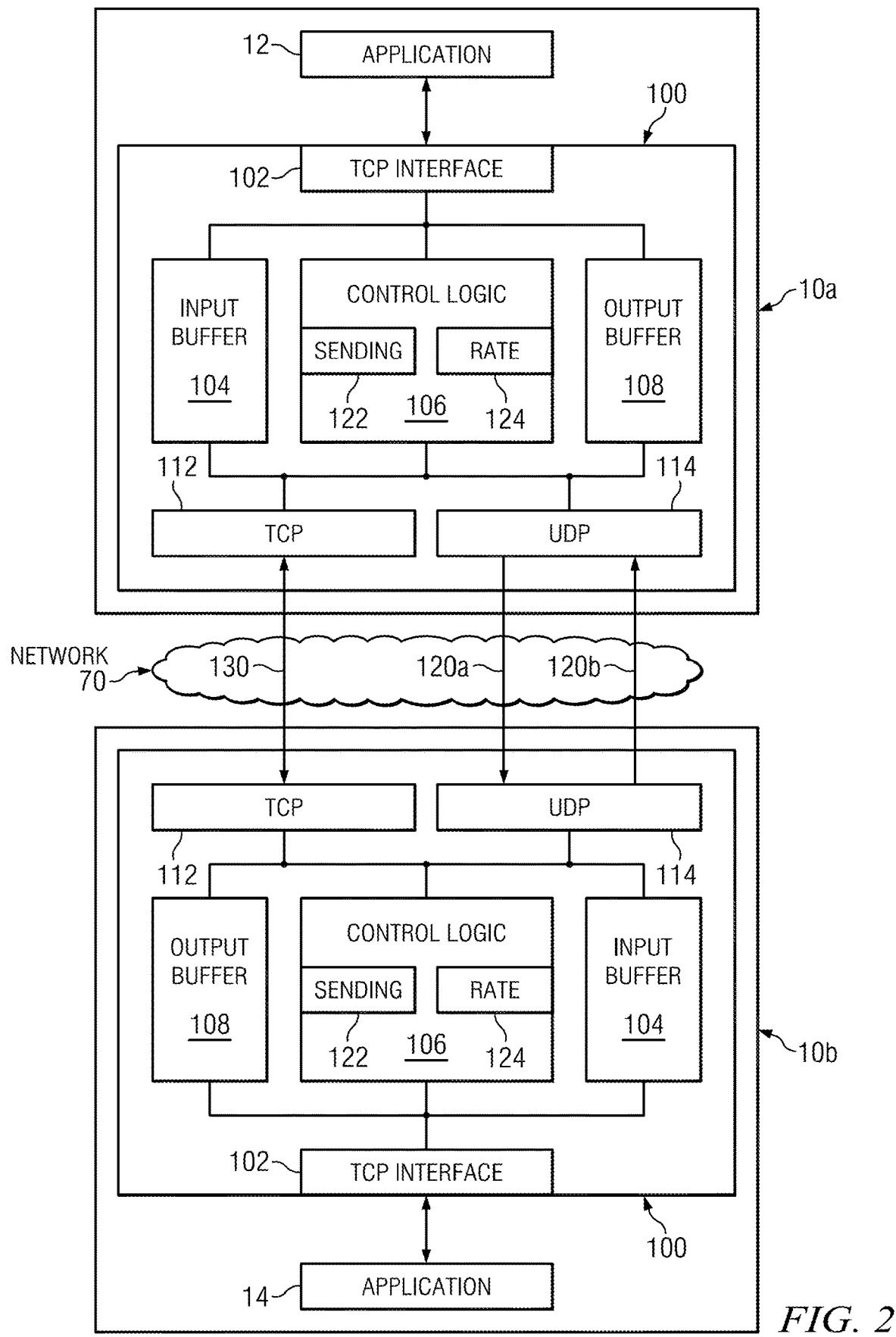
FIG. 2 is a block diagram illustrating one embodiment of a protocol module which may be employed in data transfers.

FIG. 2 depicts one embodiment of a protocol module 100 which may be employed in data transfers. In this embodiment, protocol module 100 may comprise a TCP interface 102 which can emulate one or more interfaces provided by TCP as are known in the art. The protocol module 100 may also be configured to utilize TCP protocol 112 and UDP protocol 114. It will be noted that in many cases these protocols 112, 114 come bundled with an operating systems or other piece of computer software/hardware on a system where the protocol module 100 may reside. Thus, in some embodiments protocol module 100 may be configured to interface with these protocols 112, 114 on the system where protocol module 100 resides using, for example, the interfaces provided by these protocols 112, 114.

Protocol module 100 also comprise an input buffer 104 into which received data (e.g., data received through the TCP interface 102 or over a communication channel established using TCP protocol 112 or UDP protocol 114) may be placed. Control logic 106 may be an adaptive control module configured to perform a wide variety of functionality as will be explained in detail herein and may include sending module 122 and rate module 124.

Accordingly, in certain embodiments such a protocol module 100 may be installed on devices 10, including devices 10a and 10b. An application 12 on one device 10a may attempt to transmit data to another application 14 on another device 10b using TCP, where the application 12 may be the same as, or different than, application 14. In other words, the application 12 is configured to utilize TCP to transmit data. However, when the application 12 issues such a TCP call, as the TCP interface 102 of protocol module 100 emulates the interfaces provided by TCP protocol 112 the call may instead be received by protocol module 100.

Thus, when an application 12 attempts to transmit using TCP protocol 112, control logic 106 may be configured to establish a transmission channel 120 between the protocol module 100 on device 10a with the sender application 12 and a similar protocol module 100 on the device 10 with the intended recipient application 14. The transmission channel 120 may be established using UDP protocol 114 such that data may be sent over the transmission channel 120.

It will be noted that such a UDP channel 120 may be directional. Thus, in some embodiments, in addition to establishing a UDP transmission channel 120a from the protocol module 100 on the device 10a with the sender application 12 to the protocol module 100 on the device 10b with the recipient application 14, a UDP transmission channel 120b may also be established from the recipient to the sender. This channel may be established, for example, by the control module 106 of the protocol module 100 on the recipient device 10b when the UDP transmission channel 120a from the sender to the recipient is requested or established.

In addition to the UDP transmission channels 120, the control module 106 on the sender device 10a may also establish a control channel 130 using TCP protocol 112. This control channel may be a two way TCP channel such that control data pertaining to data transmission on the UDP channels 120 may be sent and received by the protocol modules 100.

Accordingly, data received at protocol module 100 from a transmitting application 12 through the TCP interface 102 may be stored in the input buffer 104. Data may be taken from this input buffer 104, processed by control module 106 and placed in the output buffer 108. Data in the output buffer 108 is transmitted over the UDP transmission channel 120 to the protocol module 100 at the recipient device 10b. This data is received in the input buffer 104 at the recipient device 10b, processed by control module 106 and placed in output buffer 108 from where it can be delivered to the recipient application 14 using TCP interface 102.

During this transmission process, control module 106 on the recipient device 10b may determine control data, including for example, data such as acknowledgement of packets received (ACK), non-acknowledgement (NACK) indicating a packet has not been received in a certain time period, a discard acknowledgement (DACK) indicating that a packet has been discarded, a discard rate, a loss rate or other type of data. This control data may be transmitted over the control channel 130 to the protocol module 100 on the sender device 10*a*.

The control module 106 on the sender device 10*a* may utilize this control data to prioritize the data transmitted over the UDP transmission channel 120 or adjust the rate that data is sent over the UDP transmission channel 120. In one embodiment, control module 106 may include an adaptive rate module comprising sending module 122 or a data rate module 124 to calculate or control the priority of data or to adjust the data rate respectively. Control module 106 may also perform other types of control over UDP transmission channel 120 based on data received over the control channel 130.

It should be understood with respect to the discussion of embodiments herein that utilizing TCP as the protocol for establishing a control channel and UDP as the protocol for establishing a transmission channel(s) may be advantageous in conjunction with certain embodiments as these protocols are usually supplied as part of the software of computing devices. It will also understood, however, that the protocol have been discussed by way of example and that almost any protocol(s) may be utilized for a transmission channel or a control channel discussed herein. For example, other protocols that may be used for transmission or control protocols may include, Reliable User Datagram Protocol, Datagram Congestion Control, Stream Control Transmission Protocol, Resource Reservation Protocol, Real-Time Streaming Protocol, NETBeui, etc.

Figure 3:
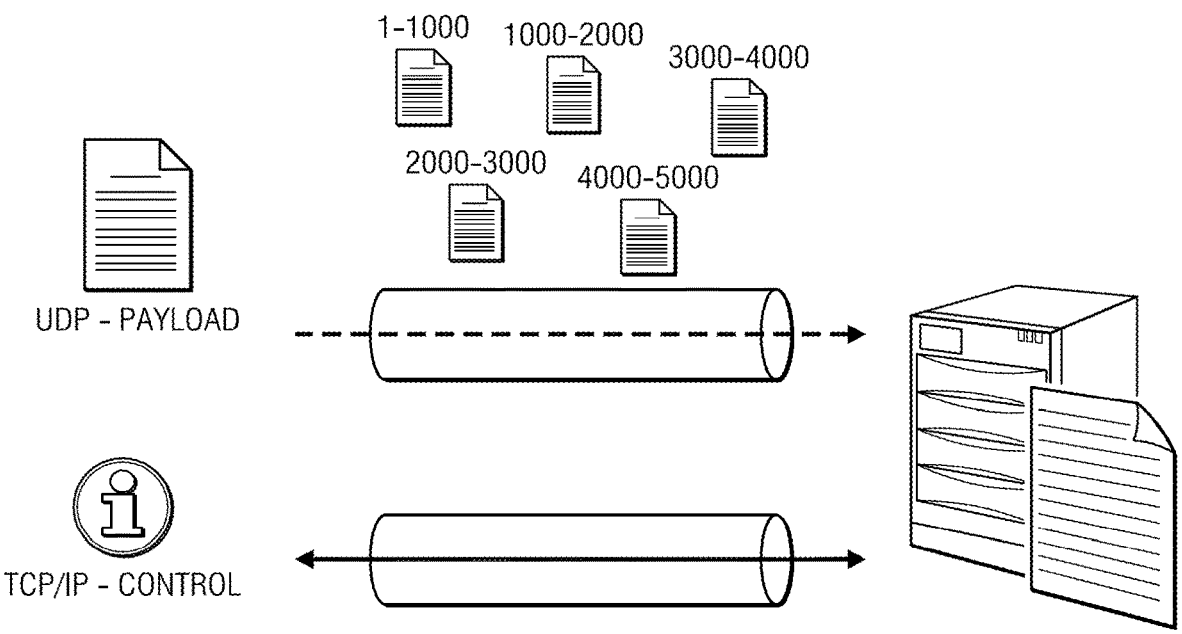
FIGS. 3 and 4 are block diagrams illustrating one embodiment of data transfer

FIG. 3 visually depicts an embodiment of the transmission of data on a transmission channel and control data on a control channel using an embodiment of a protocol. As can be seen, according to embodiments as disclosed herein data is transmitted using UDP (as opposed to for example, TCP) while control data is transmitted using TCP. Thus, the transmission of the data that it is desired to transmit is happens using a protocol (UDP) that guarantees no delivery and if data gets delivered, no order to that delivery.

Accordingly to ascertain that the delivery objective is in fact met, TCP can be employed as a control channel where control data about what is being transferred using UDP, how much of that transfer has been successfully delivered, etc. may be transmitted. Because the control channel is implemented using TCP, delivery of important information regarding transmission status etc. is guaranteed to take place in an ordered fashion.

Consequently, though an application may have intended data to be transmitted over TCP, and initiated a transmission using TCP, embodiments as disclosed herein may transmit such data over UDP and employ a control channel using TCP to ensure the delivery of the data over UDP actually occurs. The effect of latency is therefore reduced (relative to transmission of the data over TCP) as the transmission of the data occurs over UDP, while reliability is ensured through the use of TCP to implement the control channel. Furthermore, both these objectives may be accomplished substantially without alteration to the applications which utilize embodiments as disclosed herein.

Figure 4:
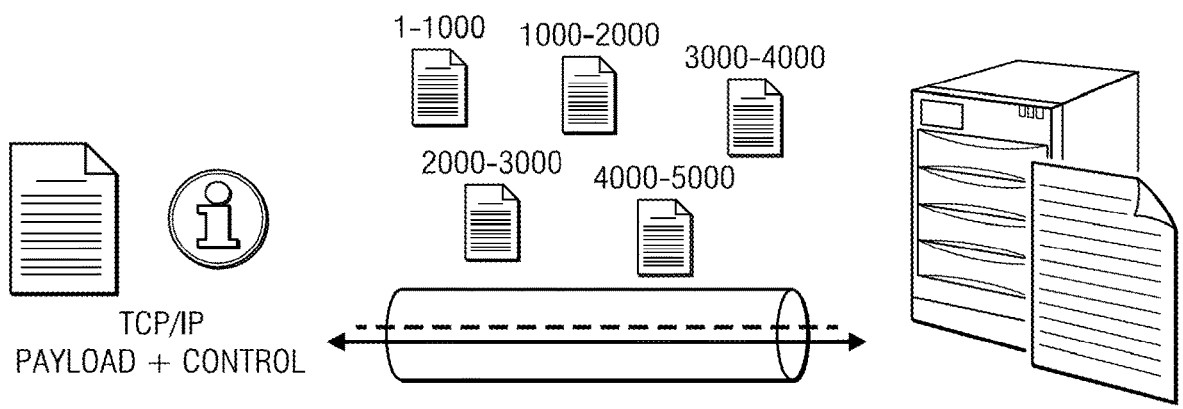

In certain cases, however, circumstances may not allow both a transmission channel and a control channel to be established. FIG. 4 visually depicts an embodiment where only a transmission channel may be established. As mentioned, in certain cases, transmission of data on a transmission channel and control data on a control channel may not be possible. This situation could be as a result of, for example, establishment of a UDP channel is not possible due to network or firewall restrictions associated with a sending or receiving devices network or that a receiving device does not have a protocol module installed (and it cannot be installed at transmission time because of restrictions), or for other reasons. In these cases, embodiments of a protocol module as discussed herein can gracefully fall back to using just a transmission channel, such as a TCP channel, for both data transmission and control purposes, as depicted in FIG. 4. In other words, the data may be transmitted using TCP by the protocol module.

For example, initially when data is received from an application the protocol module at the sending device may attempt to establish a TCP channel with the protocol module at the receiver device. Initially, the protocol module at the sending device may attempt to establish the TCP channel using port 3000. If the TCP channel can be established on port 3000, it can then be attempted to establish a UDP data channel. If the UDP channel can be established, the transmission of data may occur over the UDP channel using the TCP channel as the control channel. If the UDP channel cannot be established, the data may be transmitted by the protocol module at the sending device to the protocol module at the receiver device using the TCP channel established on port 3000.

If, however, the TCP channel cannot be established on port 3000 (e.g., because of a firewall or other reason), the protocol module at the sending device may attempt to establish the TCP channel on port 80. If the TCP channel can be established on port 80, it can then be attempted to establish a UDP channel. If the UDP channel can be established, the transmission of data may occur over the UDP channel using the TCP channel as the control channel. If the UDP channel cannot be established, the data may be transmitted by the protocol module at the sending device to the protocol module at the receiver device using the TCP channel established on port 80.

In some cases, the transmission of traffic that is not web traffic may be denied over a TCP channel over port 80. This may occur, for example, if a firewall analyzes traffic over the TCP channel. Accordingly, if the TCP channel on port 80 is denied, an attempt may be made to transmit the data over a TCP channel on port 80 by encapsulating the data in one or more HTTP packets and transmitting the data (encapsulated in HTTP packets) over port 80. By wrapping the data in an HTTP packet, the transmission of web traffic may be simulated and transmission of the data from the protocol module at the sending device to the protocol module at the receiver device over a TCP channel may be accomplished.

It will be noted here that a wide variety of other protocols may be used in other layers of the protocol stack used with embodiments of the protocol module depicted herein. In particular, in certain embodiments, the protocol module may reside between the session layer and the transport layer (with respect to the OSI reference model). Of course in other embodiments, a protocol module may reside at other locations with reference to a protocol stack. Thus, for example, one embodiment of a protocol module may receive data that has been formatted according to SHTP, HTTP, FTP, SSH, SSL or a wide variety of other protocols.

Figure 5:
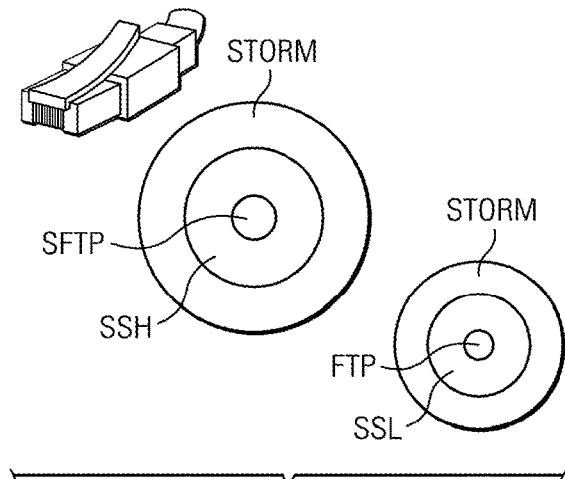
FIG. 5 is a diagram illustrating one embodiment of network wire traffic.
Figure 6:
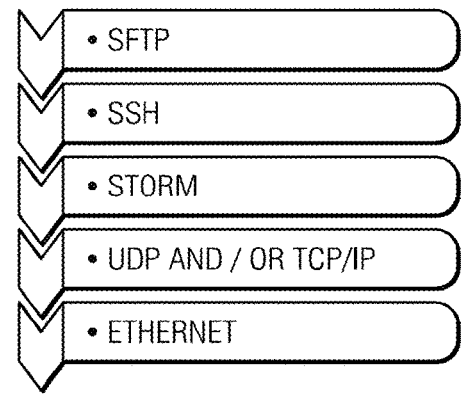
FIG. 6 is a block diagram illustrating one embodiment of a protocol stack.

FIG. 5 graphically depicts examples of the network wire traffic generated by one embodiment of a protocol module as discussed herein and FIG. 6 graphically depicts a protocol stack which utilizes a SFTP/SSH/STORM wrapping. For example, in one embodiment the network traffic would be a SFTP/SSH/STORM wrapping. In another embodiment the network wire traffic would be a FTP/SSL/STORM wrapping. The use of wrapping protocols may be useful as it is very flexible in environments where it is desired to push data to a server or other computing device that does not or cannot support embodiments as disclosed herein. In cases like these, the STORM layer can be removed from the data (e.g., using a proxy or edge server) and just the SFTP/SSH portion of the data (for example) may be passed on, thereby increasing the number of servers or other computing devise with which embodiments as disclosed can be utilized. Likewise, data coming from servers or other computing devices which do not utilize embodiments as depicted herein can be wrapped in the STORM protocol for acceleration/optimizing of the transmission of such data (e.g., using a proxy or edge server). Thus, in certain embodiments, to utilize the STORM protocol a protocol module may not be needed on the computing device of the intended recipient. Instead, such a protocol module may reside at another location such as a firewall, gateway, router, edge server, proxy server, etc., whereby the data can be received at the other location according to the STORM protocol and then passed to the intended recipient.

As can be seen then, a wide variety of protocols may be utilized in conjunction with protocol module 100. Additionally, then, a wide variety of protocols may be utilized in the implementation of protocol module 100. For example, another protocol may be utilized instead of TCP protocol module 112 and the interface of another protocol may be emulated instead of TCP interface 102. Thus, if UDP protocol 114 is the protocol utilized to establish transmission channels 120, almost no matter what the protocol a sending application is configured to utilize, the data received from the sending application 10 may be transmitted using a UDP transmission channel. This has a number of advantages, in particular in the bulk transfer of data.

Some of these advantages in the use of UDP as the data transmission protocol (no matter the original protocol which the sending application was configured to utilize) can be explained with reference to FIGS. 7 and 8. More specifically, some cases the transfer of data requires access to the entire data set (e.g., entire file) to operate efficiently.

Figure 7:
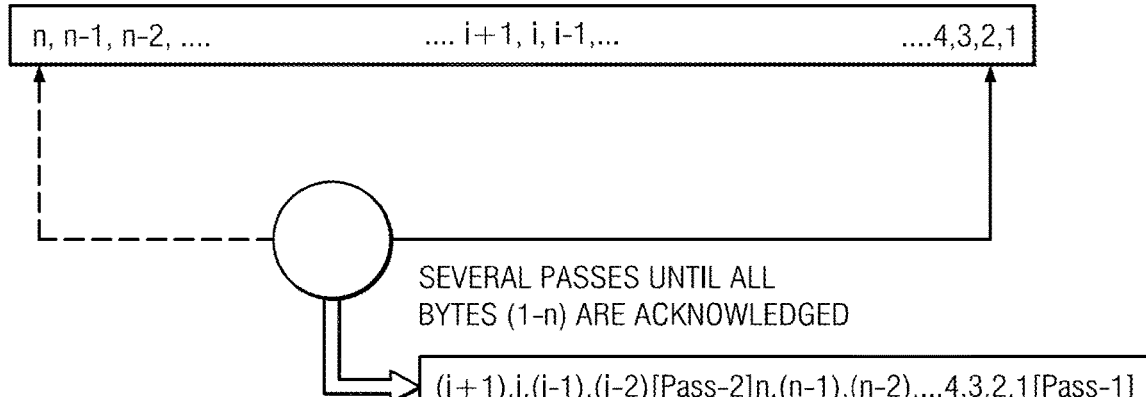
FIGS. 7 and 8 illustrate one embodiment of data transfer.

As can be seen from the depiction of these methods of transfer in FIG. 7, in some transfers the sending process sends the entire file during pass-1. Then, during pass-2, it send the un-acknowledged packets (i–2, i–1, i, i+1, etc.) While this approach may be suitable for file transfers where it is acceptable to wait for the entire file to be transferred before use of the file, such techniques may not be suitable for the transmission of certain data, including, for example, stream transmissions.

Figure 8:
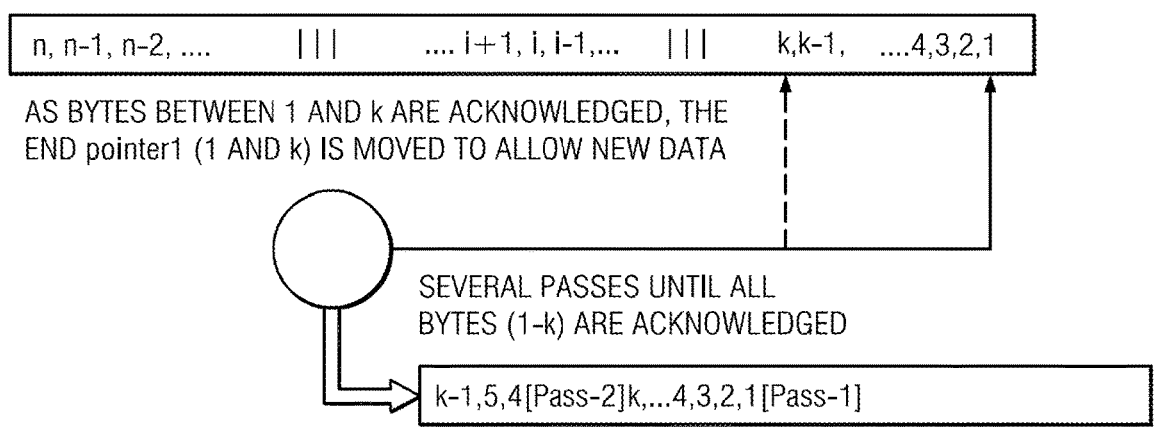

As depicted in FIG. 8, embodiments as disclosed herein may accept a portion of the file, or whatever portion of data an application decides to send, and treats that portion as a discrete transfer operation. Instead of waiting for the entire stream, file, etc. generated by the application to be sent in a single pass and then resending the un-acknowledged portions, embodiments may receive a portion of the total data from an application and send it over UDP. As these portions are acknowledged, embodiments may allow new data to be accepted and transmitted. Thus, embodiments as discussed herein may be suitable for both file transfers and general stream transmission.

It is useful here to delve into more detail regarding certain embodiments. Particularly, those embodiments which provide a TCP interface to an application, utilize the TCP protocol for establishing a control channel between a sender and a receiver and which utilize the UDP protocol to establish one or more transmission channels between the sender and the receiver (e.g., a first UDP transmission channel having directionality from the sender to the receiver or a second UDP transmission channel having directionality from the receiver to the sender).

Figure 9:
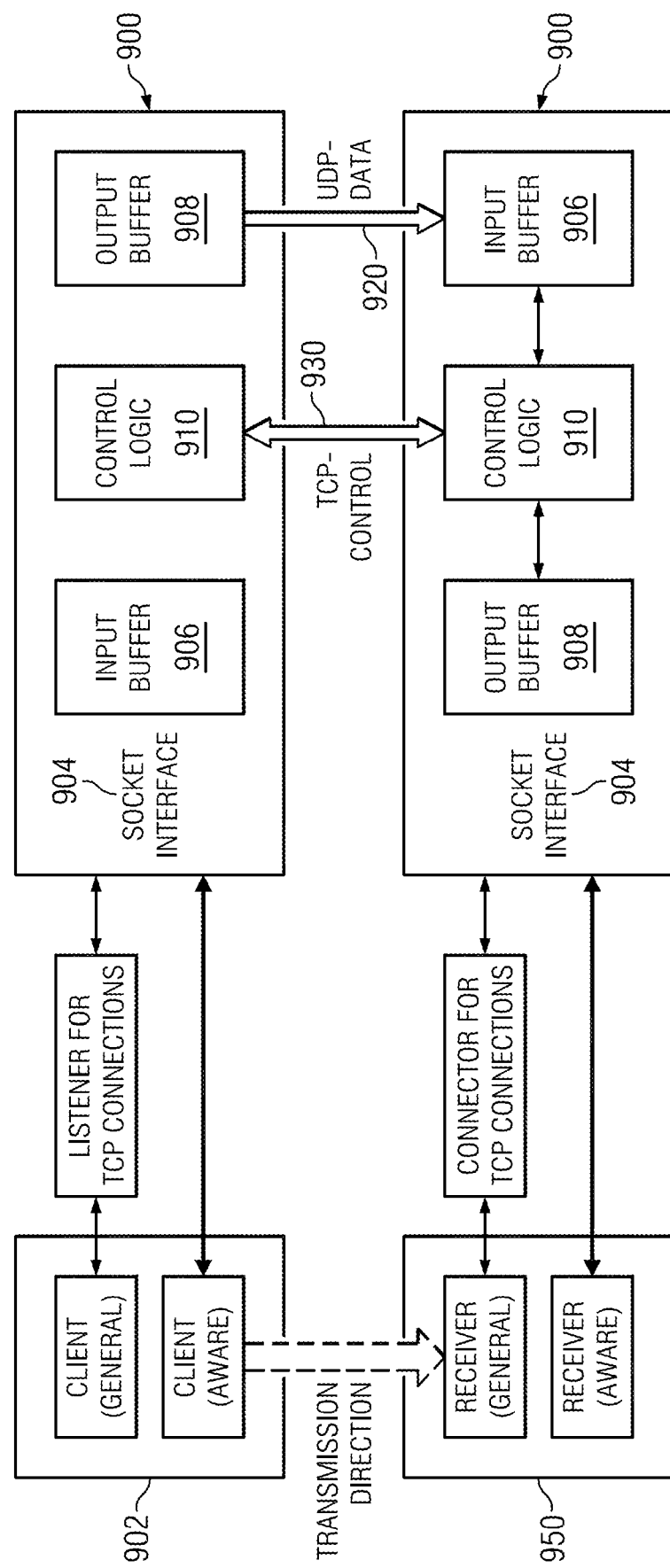
FIG. 9 is a block diagram illustrating one embodiment of an architecture for the transmission of data.

Referring first to FIG. 9, one embodiment of architecture for the transmission of data using an embodiments of a protocol module employing TCP and UDP is depicted. When a client application 902 (e.g., the sending application) makes a call to an interface (e.g., a TCP socket interface) to send data, an emulated interface 904 presented by the protocol module may receive this call and place the data in the input buffer 906. The sender protocol module 900 breaks the received data into packets and each packet may be given an ascending sequential sequence identifier (sequence ID). The packets are then put on the send queue of the output buffer 908 if there is room available. If there is no space on the send queue, the call from the sending application is blocked until room becomes available in the sending queue. When room becomes available on the send queue the packets are placed on the send queue.

A transmission channel 920 using UDP and a control channel 930 using TCP can be established between the sending protocol module 900 and the receiving protocol module 900. As discussed above, for example, if the UDP channel cannot be established, the data may be transmitted by the protocol module at the sending device to the protocol module at the receiver device using a TCP channel or the data may be transmitted over a TCP channel by encapsulating the data in one or more HTTP packets.

If, however, both a TCP control channel a UDP data channel can be established, packets on the send queue are transmitted from the protocol module 900 of the sender over UDP transmission channel 920 established with the protocol module 900 of the intended recipient, subject to the send algorithm of control logic 910 implemented by the protocol module 900. Control logic 910 may determine a send rate. A send algorithm of the control logic 900 may thus select only as many packets as are permitted by the prevailing send rate and schedule these packets for transmission.

In one embodiment, packets are retrieved from the send queue of the output buffer 908 and scheduled for transmission based on a priority scheme. Packets that have been explicitly reported as missing by the receiver protocol module (900 e.g., NACKs received over the TCP control channel 930 for those packets) are given highest priority, unless they have been retransmitted within a certain time period. Packets that have not been explicitly reported as missing but are due for retransmission (e.g., because a retransmit time has passed) are given the next highest priority. Newly added packets are given the lowest priority for transmission. When an acknowledgement (ACK) is received from the protocol module of the intended recipient over the TCP control channel, the corresponding packet is removed from the send queue and new packets may be added if they are available.

On the receiver side, the protocol module 900 receives packets over the UDP transmission channel 920 and places these packets in input buffer 906. A receive algorithm of the control logic 910 checks the sequence IDs of the received packets. If the packets with those sequence IDs have not been received before, the packets are added to a receive queue in the output buffer 908, otherwise, statistics may be updated or duplicative packets discarded, as will be discussed in more detail at a later point herein. It will be noted here that packets received over the UDP transmission channel 920 may arrive out of order and packets may fail to arrive at all.

Accordingly, in certain embodiments, the receive algorithm of control logic 910 may obtain packets from the receive queue and add them to a staging queue where the packets are ordered by their sequence IDs. The receiver algorithm keeps track of the last sequence ID delivered to the recipient application 950. If the packet with the next sequence ID is in the staging queue (i.e., is next in line for delivery to the recipient application as packets with all previous sequence IDS have been delivered to recipient application 950), it is removed from the staging queue and sent on to the receiving application 950. This receiver algorithm continues until the next packet on the staging queue is not the next in line for delivery at which point the receiver algorithm may block. The receiver algorithm continues once the packet which is next in line for delivery is placed in the staging queue.

This receiver algorithm guarantees reliable ordered delivery of the data, despite that it is arriving over an unguaranteed, out of order UDP transmission channel 920. Additionally, the use of a send queue at the sender side protocol module 900 and receive and staging queues on the receiver side protocol module 900 allows embodiments to stream send data as if performing bulk data transfer, while still receiving and delivering ordered data between end points which, in turn, allows embodiments herein to accelerate the transmission of data relative to certain other data transfer methods.

In one embodiment, these advantages are enabled through the use of dynamic adjustment of send rate and the prioritization of packets based on control data received at the sender protocol module 900 over the TCP control channel 930. In one embodiment, the protocol module 900 (e.g., the protocol module at the sender, the protocol module at the recipient or both) may monitor the operational environment during a data transmission and the send rate may be adapted to achieve substantially optimal throughput without causing or contributing to network congestion. The operational environment may encompasses statistical data such as the sender's actual send rate, the receiver's actual receive rate, the receiver's perceived network drop rate, the receiver's reported duplicate packets, the receiver's reported dropped packets, a discard rate, a loss rate, or other data that may be determined. This statistical data or other control data may be derived or otherwise determined using the control logic 910 of the protocol module (either at the sender protocol module 900 or the receiver protocol module 900 as may be appropriate).

The sender's actual send rate (e.g., packets or amount of data per time period) is a quantity that is directly measured at the sender by dividing the number of packets successfully sent during a measurement interval (e.g., number of ACKs received from the recipient over the TCP control channel) by the length of the measurement interval. The receivers actual receive rate is a quantity that may be directly measured at the receiver by dividing the number of packets arriving at the receiver during the measurement interval by the length of the measurement interval. The receiver's perceived network loss rate is a derived quantity that is calculated at the receiver using a sequence ID attached to received packets. The receiver's reported duplicates is a quantity directly measured at the receiver using a sequence ID attached to received packets to determine how many duplicative packets were received during a measurement interval. The receiver's dropped packet rate is a quantity directly measured at the receiver. It is a determination of all packets received and dropped (e.g., not placed in an input buffer 906, a receive queue or a send queue) during the measurement interval due, for example, to input buffer overflow.

As noted, in certain embodiments, these measurements may be determined using information in the packets sent over the UDP transmission channel. More specifically, in one embodiment the control logic 910 of the sender protocol module 900 includes a sequence ID with each packet transmitted and a transmission ID with each packet transmitted. The sequence ID is determined by the sender protocol module 900 and is used by the receiver protocol module 900 to ensure proper ordering when reassembling the data before delivery to the target application. A transmission ID will be assigned by the sender protocol module 900 and will increase for every packet transmitted even for duplicates. In another embodiment, only a single sequence ID is utilized indicating a sequential order of transmission or assembly. Other sequence IDs, transmission IDs, either alone or together, are also possible.

At the receiver end, the protocol module 900 inspects the sequence ID of every received packet. The sequence IDs of the received packets are used to build lists of packets to positively or negatively acknowledge (ACK/NACK), as well as keeping count of duplicate packets received. In certain embodiments, packets that have not been received before are added to an ACK list, sequence IDs that correspond to gaps in received packets are added to the NACK list, and packets with sequence IDs that have been received before are counted as duplicates. Using the sequence IDs of received packets, then, a network loss (drop) rate can be estimated as discussed above.

In one particular embodiment, for every measurement interval (time period for the measurement of control data or sending of messages on the control channel), the receiving protocol module 900 keeps track of the transmission IDs of packets arriving over the UDP transmission channel 920. When a packet arrives with an out of sequence transmission ID, the receiving protocol module updates its parameters as follows: if the arriving transmission ID is larger than an expected transmission ID, then the sum of packets with all transmission IDs between the expected transmission ID and the arriving transmission ID are added to a drop count, and the expected transmission ID is modified to be one more than the arriving transmission ID. If the arriving transmission ID is less than the expected transmission ID, then the expected transmission ID is not modified, but the drop count is reduced by one.

At the end of the measurement interval, the control logic 910 of the receiving protocol module 900 uses the total number of packets received during the measurement interval and the drop count to calculate the lost packets as a percentage of all packets transmitted over the interval (the sum of actual arriving packets and the drop count). The control logic 910 of the receiver protocol module 900 reports, over the TCP control channel 930, a quantity back to the sending protocol module 900 that is a weighted running average of the network loss percentage at the end of the measurement interval (known as receiver loss rate) along with other statistics collected by the receiver protocol module, including for example, ACKs for packets that were received during that measurement interval or NACKs for packets that were not received. It will be noted that a wide variety of techniques may be utilized to determine when to report a NACK to the sending protocol module 900. Such techniques may account for such factors as, for example, the sequence IDs of packets received, the time elapsed since reception of certain packets, etc.

In one embodiment, the sender protocol module 900 may utilize one or more of the above mentioned measurements (either alone or in combination) in order to set or adjust the target send rate. Alternatively, this target send rate may be user configurable, set to a hard target, or configured in some other manner. The target send rate may represent the number of packets or amount of data per time interval (for example, second, minute, etc.) the sender protocol module 900 will attempt to achieve or will limit itself to.

The sending protocol module 900 may reassess the target send rate every time it receives control data sent by the receiver protocol module 900 over the TCP control channel 930, or when a multiple (one or more times) of the measurement interval has lapsed without receiving the receiver's statistics. For example, when the sending protocol module 900 determines that a predefined multiple of the measurement interval has lapsed without receiving the receiver's statistics, it assumes network congestion and decreases its target send rate by a predetermined percentage. When the server receives statistics, it adjusts the target send rate upwards or downwards depending on the observed statistics (locally determined at the sender protocol module 900 or received from the receiver's protocol module 900 over the TCP control channel 930). For example, if the receiving protocol module reports excessive network loss factor (above a predetermined tolerance level), or excessive duplicates, the sender reduces its target send rate by a predetermined percentage. Also, if the actual send rate is much larger than actual receive rates, the sender reduces its target send rate, as un-reported network loss/congestion may be assumed.

If the actual send and receive rates are close to each other, the drop and duplicate rates are within tolerable values, and the reported loss factor is below a predetermined trigger value, then the sender attempts to increase the target send rate by a current increase percentage value (which may be configurable). Whenever the target send rate is increased, the amount of the increase (represented as a percentage of the current target send rate) may also be increased. This allows slow starts (e.g., low target send rates or low increases to the target send rate) to avoid overwhelming the network while allowing rapid increase of send rates to make use of available bandwidth. It is possible that the actual send rate may not be able to catch-up to the target send rate (e.g., due to network adapter limitation, of other factors). In this case, the target send rate may not be increased. The target send rate may also be kept unchanged if the network reported loss factor is less than the tolerance value but above the increase trigger value.

Figure 10:
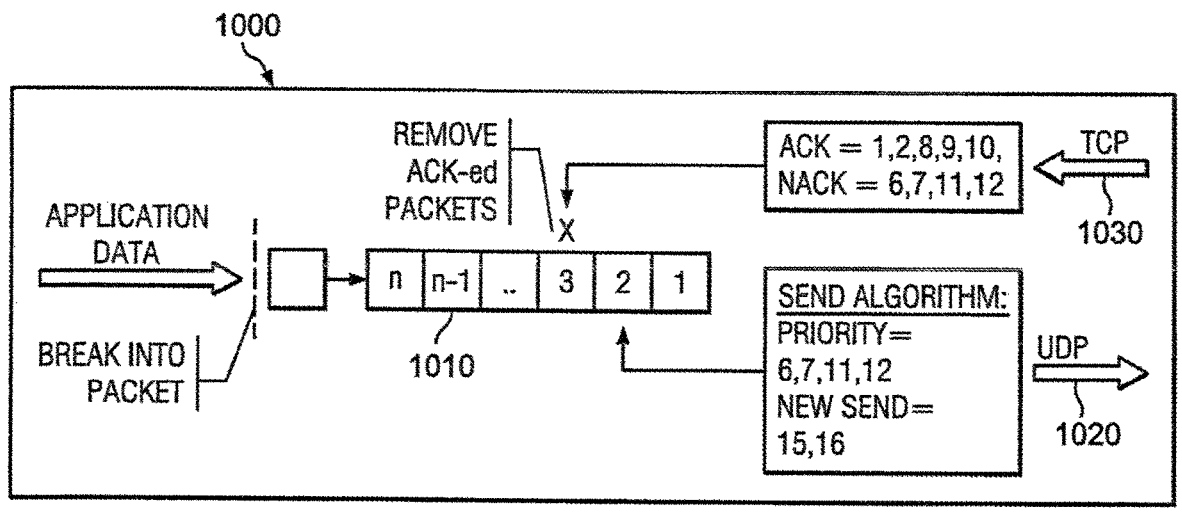
FIGS. 10 and 11 are block diagrams illustrating one example of the functionality of a protocol module
Figure 11:
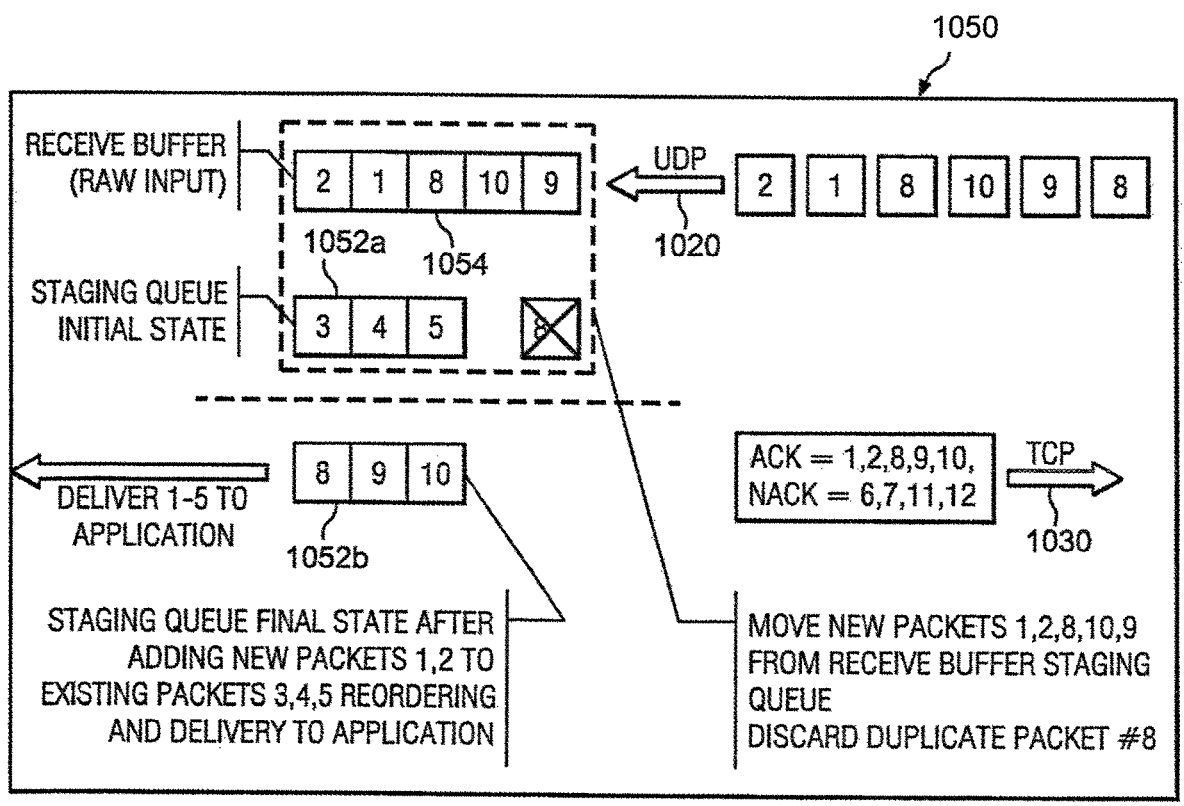

FIGS. 10 and 11 depict respectively, one example of the functionality of an embodiment of a protocol module utilized to send data at a sender and the use of the embodiment of the protocol module in receiving such data at a recipient. The sender protocol module 1000 receives data from a sending application through a protocol interface (e.g., a TCP interface such as a socket call), breaks that received data into packets, assigns sequence IDs to the packets and places them on the send queue 1010 if there is room. This send queue may, for example, be on the order of 5 MB or greater. Suppose, for example, that here the sender protocol module 1000 has previously transmitted packets with the sequence IDs 1-5 (referred to for purposes of this example as packet 1, packet 2, etc.) to a receiver protocol module 1050 using the UDP transmission channel 1020 established between them. However, only packets 3, 4 and 5 were received by the receiver protocol module 1050.

Thus, at this point, the staging queue 1052*a* of the receiver protocol module 1050 (which may also be on the order of 5 MB or greater) initially comprises packets 3, 4 and 5 but receiver protocol module 1050 cannot deliver any data to the recipient application as packets 1 and 2 have not yet been received. Suppose furthermore that sender protocol module 1000 now transmits packets 2, 1, 8, 10, 9 and 8 over the UDP transmission channel 1020. When these packets are received at the receiver protocol module 1050, they may be placed in the receive queue 1054 (for example, in the order they were received). Receive queue 1054 may also be on the order of 5 MB or greater. These packets may then be moved into the staging queue 1052 and ordered. When the packets are placed into the receive queue 1054 or moved into the staging queue 1052 as packet 8 has been received twice one of the received packet 8s may be discarded.

Accordingly, continuing with this example, as receiver protocol module 1050 has now received packets 1 and 2 the receiver protocol module 1050 can then deliver packets to the receiver application. As packets 1-5 have now been received, these packets may be delivered to the receiver application. Staging queue 1052*b* depicts the state of the staging queue 1052 after packets 1-5 have been delivered to the receiving application and packets 8-10 cannot be delivered as packets 6 and 7 have not yet been received.

Additionally, receiver protocol module 1050 may report control data to the sending protocol module 1000 over TCP control channel 1030. In this case, receiver protocol module 1050 may ACK packets 1, 2, 8, 9 and 10 and may NACK packets 6, 7, 11 and 12. These ACKs and NACKs may be received over TCP control channel 1030 by sender protocol module 1000. The packets that have been acknowledged, 1, 2, 8, 9 and 10, may be removed from the send queue 1010. Assume now, for purposes of this example, that when these packets are removed packets 15 and 16 which were received are added to the send queue 1010. The send module of the protocol module 1000 may utilize the NACKs to prioritize the next transmission of data. In this example, as packets 6, 7, 11 and 12 have been NACKed over the TCP control channel 1030 they may be given the highest priority for the next transmission of data over UDP channel 1020 while the most recently added packets (15, 16) may be given the lowest priority for transmission.

To further aid in understanding embodiments as presented herein, it will now be useful to discuss methods which may be utilized by a protocol module to send data, adjust the rate of data transmission or prioritize the transmission of packets of data on a transmission channel using control data sent from a receiving protocol module using a control channel of a different protocol than the transmission channel.

Figure 12:
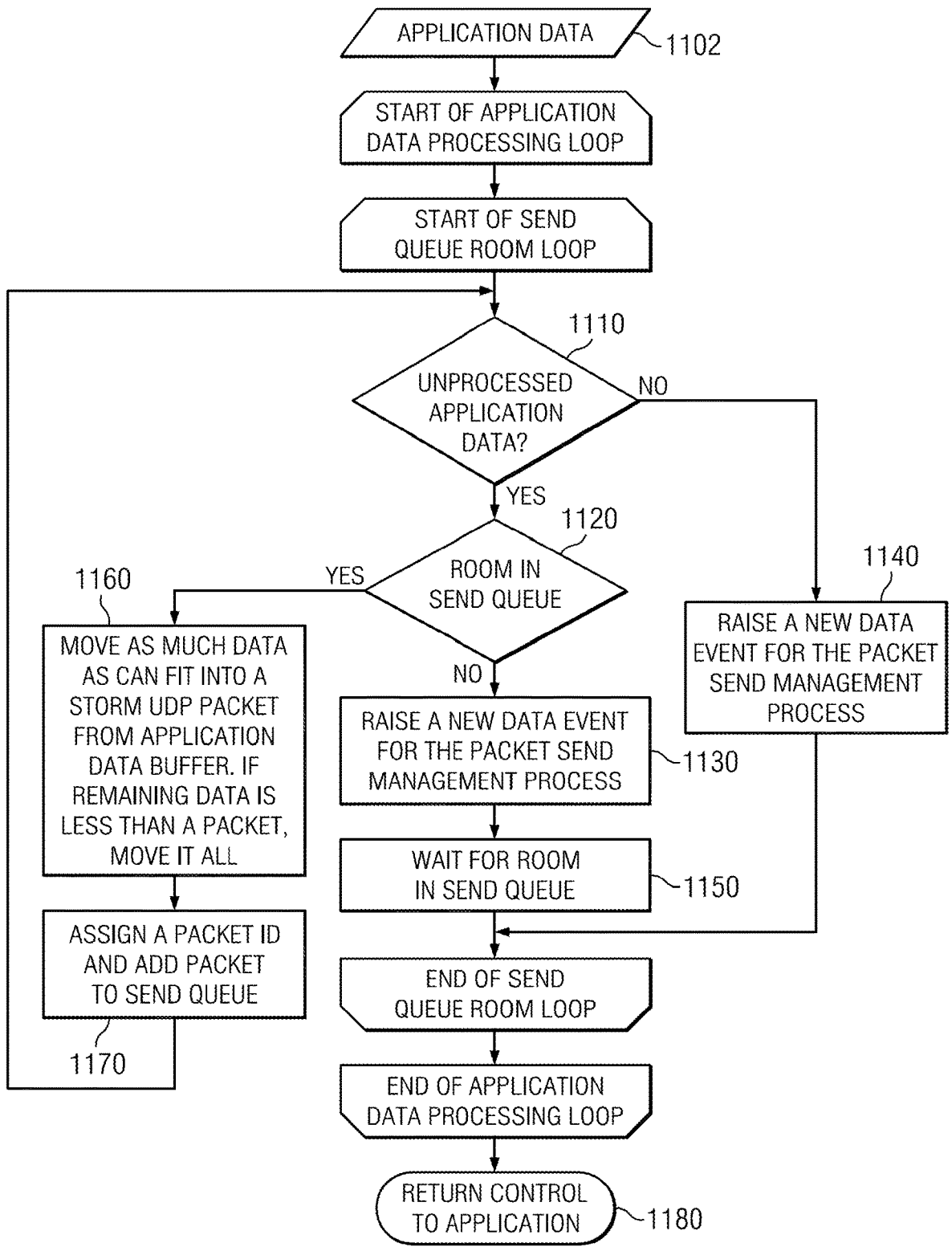
FIG. 12 is a flow diagram illustrating one embodiment of a method for the reception and queuing of data from an application.

Referring first to FIG. 12, one embodiment of a method for the reception and queuing of data from an application at a protocol module is depicted. It should be noted that one instance of a process (e.g., a thread) may be executed for the protocol module and handle all application that wish to send data or an instance of the method may be executed for each transmission of data by each application.

When data is presented to the protocol module for transmission, data may be placed on the send queue for that purpose. When a sender application requests data to be sent, the protocol module holds the request and checks the send queue for space. If space is available, the input data is packetized and added to the send queue until either the entire input data is consumed, or the send queue is full. Whenever new packets are added to the send queue, this process signals an event to a send module to indicate new packets are available for transmission.

Initially, data may be received from an application at step 1102. The data may be received from a sending application through an emulated interface for a particular protocol, such as a TCP socket interface or the like. At this point a control channel and a data channel may be established, if possible. If one or more of these channels cannot be established, certain actions may be taken as described above.

If both a control channel and a data channel can be established, when data is received an application processing loop can be performed. Within this application processing loop a send queue room loop may be executed. At step 1110 it can be determined if there is data received from the application that has not been processed. If data still exists at step 1120 it can be determined if there is room in the send queue of the protocol module. If there is room in the send queue, at step 1160 a packet is created by the protocol module (e.g., a STORM packet) with the maximum amount of application data that can fit in the packet, or if less than the maximum amount remains, the entire remaining portion may be placed in the STORM packet. In one embodiment, these packets may be around 1500 bytes. The created packet can then be assigned (the next) sequence ID and added to the send queue at step 1170.

It can then be determined again at step 1110 if there is remaining application data. If there is no more unprocessed application data a "New Data" event can be raised at step 1140, indicating to a send module of the protocol module that there is data available to send. The send queue room loop and application data processing loop can then be ended and control retuned to the sending application at step 1180. If there is unprocessed application data, but there is no room in the send queue at step 1120, a "New Data" event can be raised at step 1130, indicating to a send module of the protocol module that there is data available to send and the send queue loop is paused or otherwise blocked at step 1150 until room is available in the send queue at step 1120. When room becomes available the process may resume at step 1160.

Figure 13:
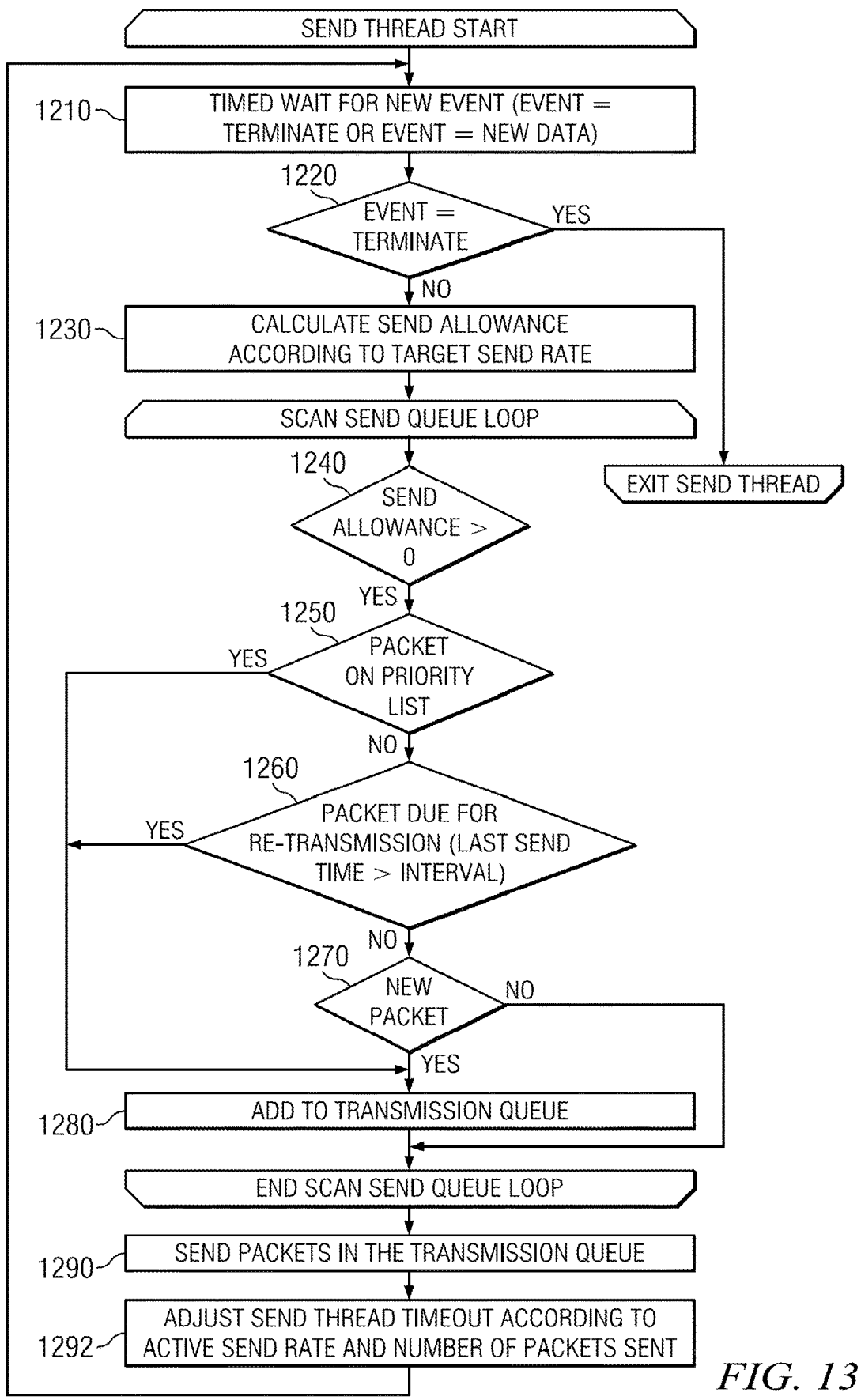
FIG. 13 is a flow diagram illustrating one embodiment of a send method.

Turning to FIG. 13, one embodiment of a send method that may be utilized by embodiments of a protocol module is depicted. Again, it should be noted that one instance of the process (e.g., a thread) may executed for the protocol module and handle all application that wish to send data or an instance of the method may be executed for each transmission of data by each application. This method may be utilized by a protocol module to determine which packets to send in order to achieve greater throughput and reduce queue fill rates.

At step 1210, an event may be received (e.g., from a queuing process or the like). For example, an event queue may be polled at a certain time interval, or the event may be received directly by the send method, or some other technique may be utilized for receiving an event. In some cases, the event may be a terminate event or a new data event. If the event is a terminate event at step 1220, the send thread may be terminated and no more data sent. If however, the event is a new data event, a send allowance may be calculated at step 1230. This send allowance may be the amount of data that may be sent during the next transmission (or a future time period) and may be based on a wide variety of criteria, including for example, the target send rate, the amount of data already sent during a time period, the current send rate, or other criteria.

For example, the send allowance may be determined based on a current send rate of the protocol module and the number of packets previously transmitted (e.g., in a time period associated with the send rate). The send rate may be adjusted based on a number of criteria as will be explained in more detail later.

At step 1240 then, it can be determined if the send allowance is greater than zero. If the send allowance is greater than zero, it can then be determined if any packet in the send queue is on the priority list at step 1250. If so, and the packet qualifies for retransmission (e.g., it has not been already retransmitted recently), then this packed is added to the transmission queue for retransmission at step 1280. This packet can then be subtracted from the send allowance and it can again be determined at step 1240 if the send allowance is greater than zero.

The priority list may comprise, for example, packets for which a NACK was received from a receiver protocol module over a control channel. Thus, if a NACK with a particular packet's sequence ID was received from on the control channel, an identifier for this packet may be placed on the priority list. Additionally, packets on the send queue on the priority list with the lowest sequence ID may be prioritized over packets on the priority list with higher sequence IDs, etc.

The priority list may also comprise, for example, packets for which neither an ACK nor a NACK has been received in a certain time period or the time since the last attempt to send a packet exceeds a certain time period. This time period may be referred to as the retransmit time period (RTT). Initially, the RTT may be configured or may be dynamically determined, for example, using transmissions on the control channel. The RTT may also be dynamically adjusted during the transmission of data by the protocol module. Thus, if neither a NACK nor an ACK a particular packet's sequence ID was received on the control channel in a RTT or the time period since the last attempt to retransmit that packet exceeds the RTT, an identifier for this packet may be placed on the priority list.

If the send allowance is greater than zero at step 1240 and there are no packets on the priority list at step 1260 it can then be determined if any packets are due for retransmission at step 1260. If so, this packed is added to the transmission queue for transmission at step 1280. This amount of data in the packet can then be subtracted from the send allowance and it can again be determined at step 1240 if the send allowance is greater than zero. Packets due for retransmission may be packets which were transmitted more than some time threshold ago (e.g., around 500 milliseconds or so) and for which neither an ACK nor a NACK has been received from the receiver protocol module on the control channel. In one embodiment, the time threshold may be a retransmit time that may be determined or dynamically adjusted during the transmission of data, as will be discussed in more detail at a later point. Again, packets on the send queue due for retransmission with the lowest sequence ID may be prioritized over packets due for retransmission with higher sequence IDs, etc.

If the send allowance is greater than zero at step 1240, there are no packets on the priority list at step 1250 and there are no packets due for retransmission at step 1260 any remaining packets may added to the transmission queue in order of their sequence IDs at step 1280. When there are no more packets or the send allowance is not greater than zero, the packets placed in the transmission queue may be sent at step 1290.

Figure 14:
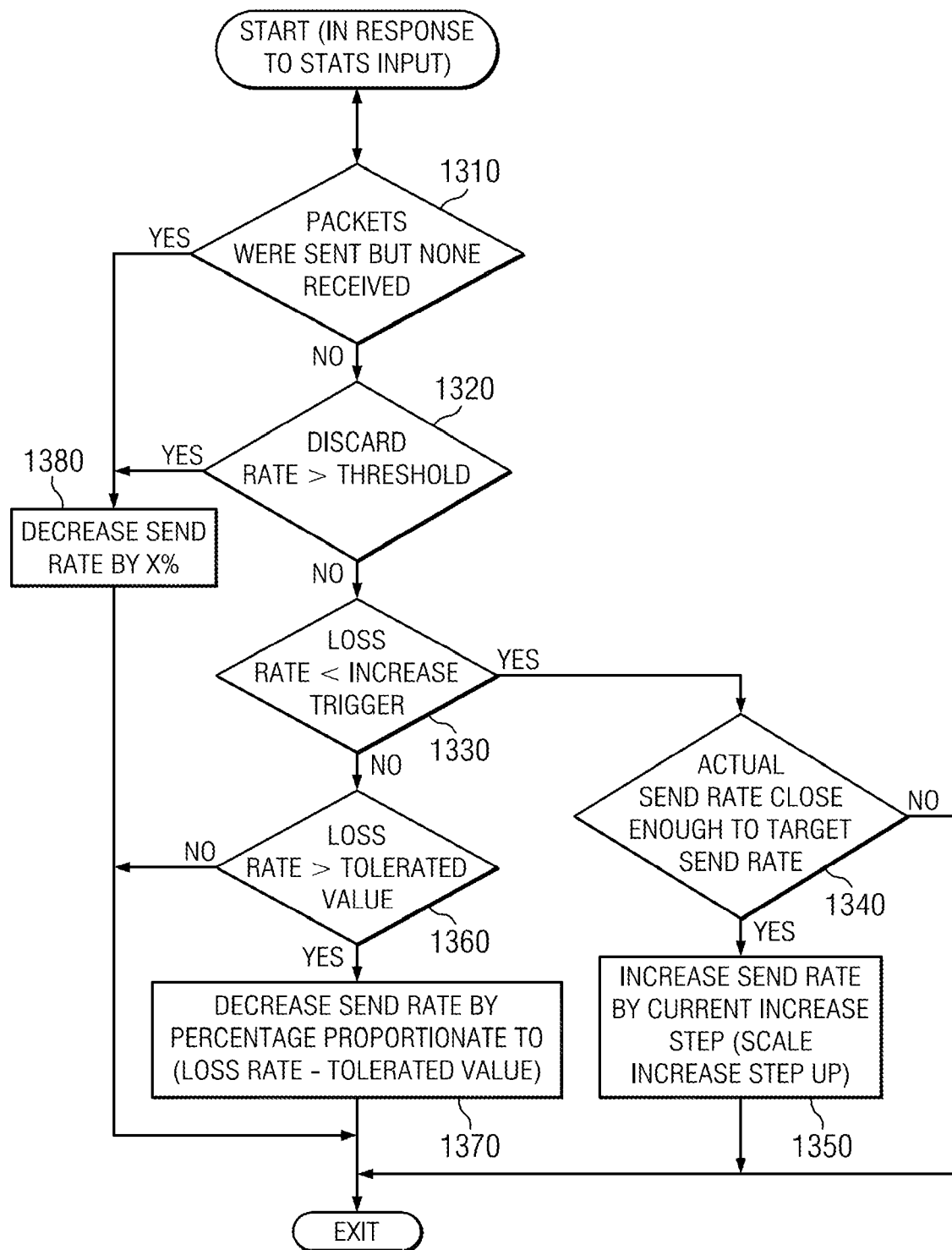
FIG. 14 is a flow diagram illustrating one embodiment of a method to adjust the rate of data transmission.

Moving on to FIG. 14, one embodiment of a method that may be employed by a protocol module to adjust the rate of data transmission is depicted. Such a method may be initiated at a time interval (e.g., based on the current send rate of the protocol module), or for example, whenever control data such as statistics or the like is received over the control channel from the receiver protocol module or based on activities of the sender protocol module, for example, whenever the sender is preparing to send data or place data on transmission queue.

From the control data it can be determined at step 1310 if no packets from a previous transmission were received by the receiving protocol module. For example, if NACKs were received for every packet previously transmitted or if no data was received from the receiver protocol module. In this case, the current send rate can be decreased by a certain percentage (which may be configurable, or may be some set percentage such as 5%) at step 1380. Additionally, the percentage by which the current send rate may be decreased may be varied based on factors, such as the current send rate itself, the target send rate, the distance between the current send rate and the target send rate, or other factors. The current send rate may also be decreased based on some measure other than percentage, such as an amount of data.

If packets were received it can be determined at step 1320 if the discard rate is greater than a threshold (again which may be configurable, hard coded, algorithmically determined, etc.). In some embodiments, the receive queue of the protocol module may be a fixed size. In such cases, a critical condition may be reached in which the receive queue of a protocol module is full but the receiver protocol module cannot deliver any more data to the application because it is waiting for one or more particular packets to arrive (e.g., one or more packets with particular sequence IDs).

In such cases, the receiver protocol module may be forced to discard any other packets it receives (e.g., any packets other than the particular packets for which it is waiting). These discard events may be reported as control data to the sender protocol module over the TCP control channel using an event such as a DACK (discard acknowledgement). Thus, the discard rate may be calculated at the sending protocol module may be a percentage which is a function of the number of DACKs received in a time period and the number of packets sent in that time period.

Thus, if the discard rate is greater than the threshold at step 1320 the actual send rate can be decreased by a certain percentage at step 1380. Otherwise, it can be checked if a loss rate (e.g., the sender loss rate) is less than an increase trigger. In one embodiment, the sender loss rate may be calculated at the sender protocol module based on the difference between the actual send rate and a receive rate that may be received from a receiver and based on the network loss rate reported by the receiver. For example, in one embodiment, the sender loss rate may be an effective loss rate that is a calculated based on the loss rate received from the receiver protocol module and the difference between a reported receive rate and the calculated actual send rate. The effective loss rate is a weighted average of the two quantities. Again, a loss rate may be a percentage or some other type of measure. The increase trigger may be a value which is hardcoded, configurable, dynamically adjusted, etc.

If the loss rate is less than the increase trigger at step 1330 it can then be checked at step 1340 if the actual send rate is within a certain tolerance (e.g., absolute value, percentage, etc.) to a target send rate. An actual send rate may be determined as discussed above by the sender protocol module or the receiver protocol module. The target send rate may be computed goal send rate. The target rate (e.g., number of packets or amount of data per second) can be set at some fixed value (configurable, user set, algorithmically determined, etc.). As the transfer of data occurs the target send rate can be adjusted up or down based upon environmental conditions or control data, or some other measurement. The target send rate may keep climbing (at varying or the same intervals) until such a point as the target send rate fails to match the target send rate increase attempt. When this happens the target send rate may be held flat or decreased.

If the actual send rate is within the tolerance of the target send rate at step 1350 the target send rate may be increased by a certain amount. As with the decrease of the send rate, the percentage by which the target send rate may be increased may be varied based on factors, such as the actual send rate itself, the target send rate, the distance between the actual send rate and the target send rate, or other factors. The target send rate may also be increased based on some measure other than percentage, such as an amount of data. It will be noted that the percentage by which to increase the target send rate may be lower than the percentage which is used to decrease the actual send rate, as in certain embodiments it may be better to aggressively slow down the actual send rate and conservatively speed the actual send rate up.

If the actual send rate is not within the tolerance of the target send rate at step 1350 the target send rate may not be increased. Alternatively, the target send rate may still be increased. If the loss rate is not less than the increase trigger at step 1330 it can be determined if the loss rate is greater than a tolerated value at step 1360, where the tolerated value may again be configurable, dynamically determined by algorithm or otherwise determined. If the loss rate is greater than the tolerated value the actual send rate may be decreased. In one embodiment, the decrease may be a percentage proportionate to the loss mate minus the tolerated value at step 1370.

Figure 15:
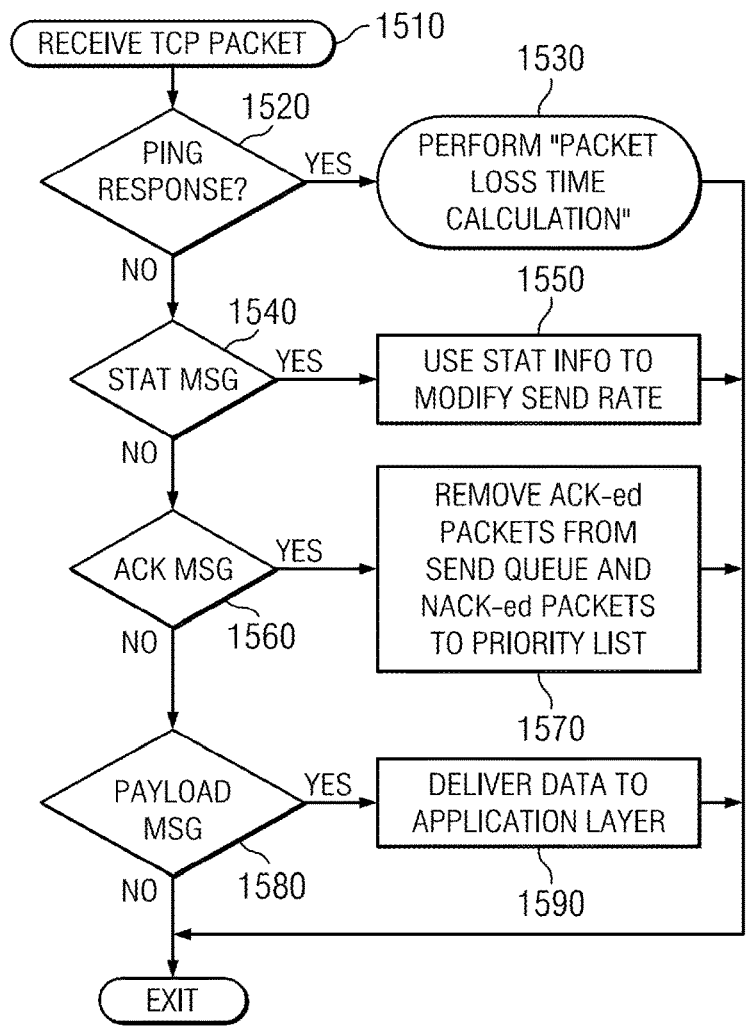
FIG. 15 is a flow diagram illustrating one embodiment of a method for receiving packets on a control channel.

Moving now to FIG. 15, one embodiment of a method that may be employed by a protocol module in receiving packets on a control channel is depicted. While the embodiment will be illustrated utilizing the TCP protocol as an example, it will be understood that the embodiment may be generally utilized with the reception of packets on a control channel implemented with almost any protocol.

Initially, a packet may be received on the control channel at step 1510. At step 1520 it can be determined if the received packet is a response to a ping. A ping may be a packet sent over the control channel or the transmission channel to determine data associated with the network, such a round trip time. If the received packet is a response to a ping, a packet loss time calculation may be performed at step 1530. A packet loss time may be time period after which a packet may be prioritized for retransmission if no ACK has been received from the receiver. One embodiment of performing such a packet loss time calculation is depicted in more detail in FIG. 16.

Still referring to FIG. 15, if the packet is not a response to a ping at step 1520 it can be determined at step 1540 if the packet is a STAT message. A STAT message may be a packet from a receiver that includes statistical data, as will be discussed in more detail later herein. If the received packet is a STAT message the statistical data in the packet may be used to modify the send rate of the protocol module at step 1550.

If the packet is not a STAT message at step 1540 it can be determined at step 1560 if the packet is an ACK message. An ACK message may be a packet from a receiver that includes data on the sequence IDs of packets that have been received at a receiver, as will be discussed in more detail later herein. An ACK message may also include data on sequence IDs of packets that have not been received at a receiver. If the received packets is an ACK message any packets with sequence IDs that have been identified as being received (ACKed) can be removed from the send queue of the protocol module and packets with sequence IDs that have been identified as not being received (NACKed) can be added to the priority list of the protocol module at step 1570.

If the packet is not an ACK message at step 1560 it can also be determined at step 1580 if the packet is a payload packet comprising data that is being transmitted (e.g., in the case where data is being transmitted over the control channel). If so the data in the packet may be delivered by the protocol module to the application layer at step 1590.

Figure 16:
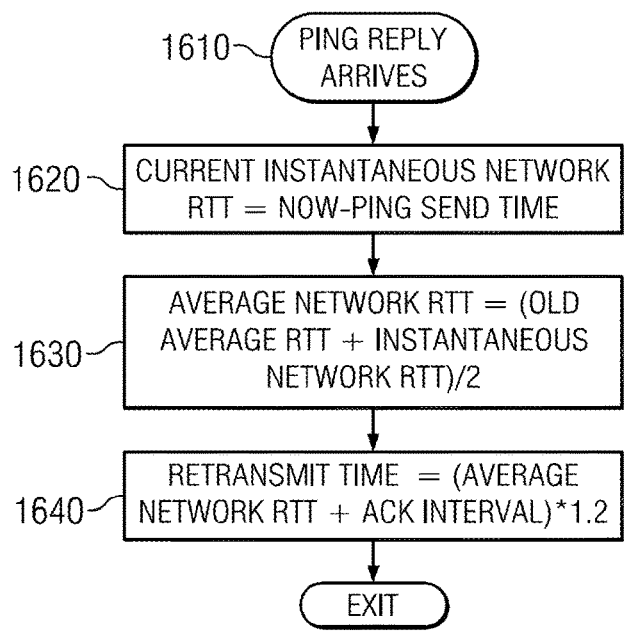
FIG. 16 is a flow diagram illustrating one embodiment of a method for determining a retransmit time.

FIG. 16 depicts one embodiment of a method that may be employed by a protocol module in determining a packet loss time (also referred to as a retransmit time). As discussed above, to determine a round trip time (RTT) on the network a ping packet may be sent over the control channel or the transmission channel. When a response to that ping arrives at step 1610 the current instantaneous network RTT is determined by taking the difference between the time the packet was sent and the time it was received at step 1620. At step 1630, to avoid instantaneous spikes in the calculation of RT, an average network RTT may be determined by taking the current average network RTT, adding it to the instantaneous RTT and dividing by two. As no average network time will exist initially, if there is no current average network RTT it may be set to the instantaneous RTT. The retransmit time can then be determined at step 1640 by summing the average network RTT and the ACK interval (which is the time interval at which ACK messages may sent by a protocol module and will be discussed in more detail at a later point) and multiplying by 1.2.

Figure 17:
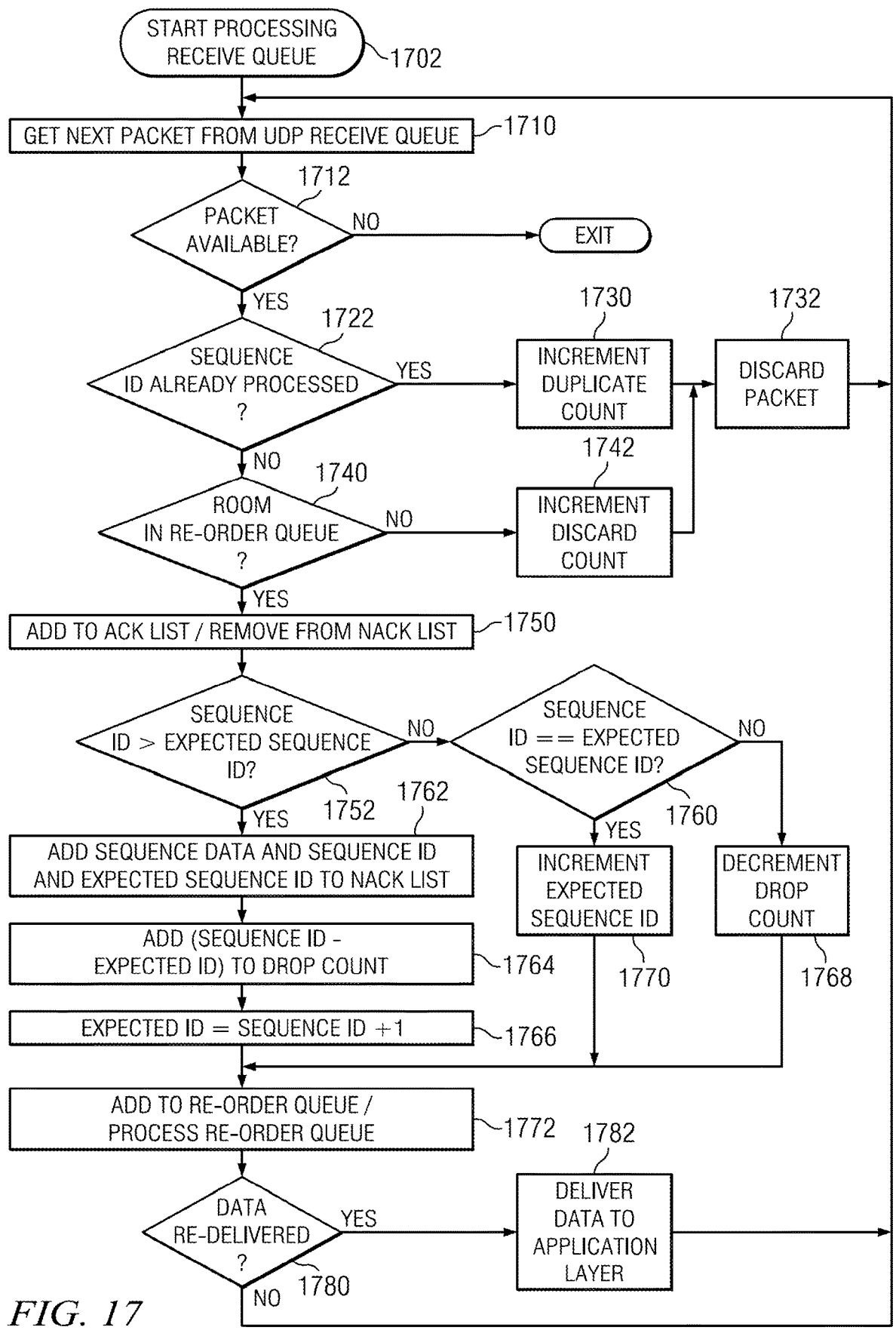
FIG. 17 is a flow diagram illustrating one embodiment of a method for receiving a packet.

Turning to FIG. 17, one embodiment of a method that may be employed by a protocol module in the reception of a packet on the transmission channel is depicted. While the embodiment will be illustrated utilizing the UDP protocol as an example, it will be understood that the embodiment may be generally utilized with the reception of packets on a transmission channel implemented with almost any protocol.

The processing of the receive queue in which packets received on the transmission channel may begin at step 1702. At steps 1710 and 1712 it can be determined if there is a packet on the queue that is available for processing. If there is not the method may be stopped, or may pause, for a period of time. If a packet is available for processing, the packet may be processed. Initially, the sequence ID of the packet may be determined and at step 1722 it can be determined if the sequence ID of the packet is a duplicate of any sequence IDs of packets that has been previously received. If the sequence ID is a duplicate, a duplicate count may be incremented at step 1730 and the received packet discarded at step 1732. Another packet may be obtained at steps 1710, 1712 if it is available.

If the sequence ID is not duplicative, at step 1740 it can be determined if there is room in the staging queue (also known as the re-order queue). If there is no room, a discard count may be incremented at step 1742 and the packet discarded at step 1732. Another packet may be obtained at steps 1710, 1712 if it is available.

In one embodiment, space may be reserved (e.g., kept free) in the staging queue for packets which have not yet been received, but whose sequence ID falls between sequence IDs of packets that have been received and placed in the staging queue. Thus, the determination of whether there is room in the staging queue may comprise determining the size of the number of packets between the lowest sequence ID of any packet in the staging queue and the highest sequence ID of any packet in the staging queue and comparing this size with the size of the staging queue to determine if they are equal or within some threshold of one another.

For example, if packets with the sequence IDs 3, 4, 5, 8, 11 and 17 have been previously received and are in the staging queue, space may be reserved in the staging queue for packets with the sequence IDs 6, 7, 9 and 12-16. Thus, when determining whether the staging queue is full the size of 15 packets (e.g., the number of packets between the sequence ID of 3 and the sequence ID of 17) may be used. The size of 15 packets can then be compared with the size of the staging queue to see if the amount of data is within some threshold.

If there is room in the staging queue at step 1740, the sequence ID may be added to an ACK list and if needed, removed from a NACK list at step 1750. At step 1752 it can be determined if the sequence ID of the received packet is larger than an expected sequence ID. The expected sequence ID may be initially set to an initial value (e.g., 0 or 1). If the sequence ID of the packet is not greater than the expected sequence ID it can be determined if the sequence ID of the received packet is equal to the expected sequence ID at step 1760 and, if so, the expected sequence ID can be incremented and the received packet added to the staging queue at step 1772. If the sequence ID of the received packet is not equal to the expected sequence ID at step 1760 a drop count may be decremented and the received packet added to the staging queue at step 1772.

Retuning to step 1752, if the sequence ID of the received packet is greater than the expected sequence ID, the sequence IDs (if any) between the sequence ID of the received packet and the expected sequence ID can be added to the NACK list and the received packet added to the staging queue at step 1772. For example, if the sequence ID is 10 and the expected sequence ID is 7 the sequence IDs 7, 8 and 9 may be added to the NACK list. Furthermore, the difference between the sequence ID of the received packet and the expected sequence ID may be added to the drop count at step 1764 and the expected sequence ID set the sequence ID of the received packet plus one. For example, if the sequence ID is 10 and the expected sequence ID is 7, the drop count may be incremented by 3 and the expected sequence ID set to 11. The received packet can then be added to the staging queue at step 1772.

At step 1780 it can then be determined if there is data to be delivered. This determination may be made based on the amount of contiguous data in the staging queue. For example, in one embodiment, the packet in the staging queue with the lowest sequence ID may be determined, and if the amount of data comprised by packets having consecutive sequence IDs beginning with the lowest sequence ID is equal to, or greater than, the amount of data of a logical block of the protocol that is being utilized as the protocol of the protocol layer above the protocol module it may be determined that there is data to be delivered.

If there is data to be delivered, at step 1782 the data may be delivered to the application layer (either directly or indirectly). Another packet may be obtained at steps 1710, 1712 if it is available.

Figure 18:
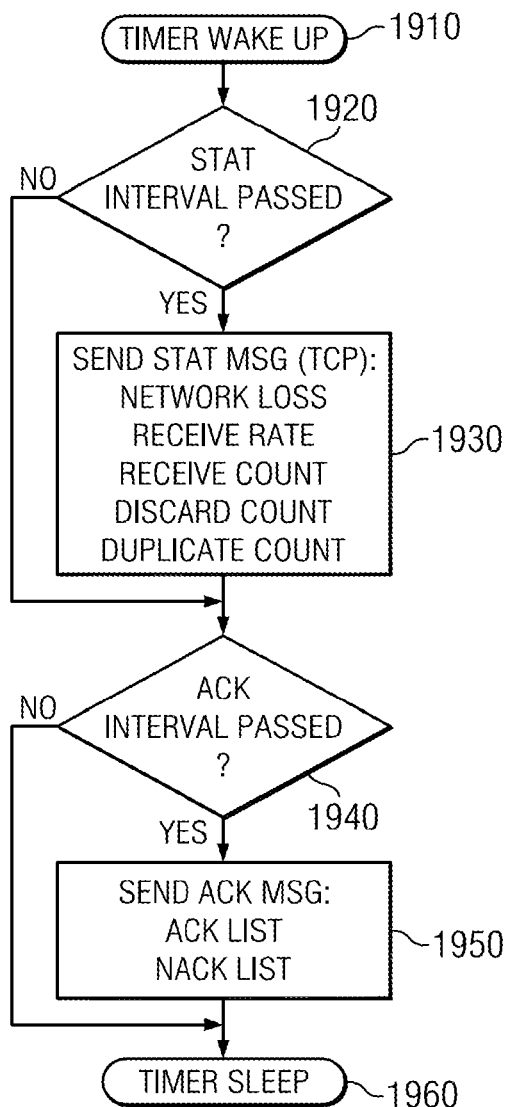
FIG. 18 is a flow diagram illustrating one embodiment of a method for sending a message on a control channel.

Referring to FIG. 18, one embodiment of a method that may be employed by a protocol module to send a control message is depicted. While the embodiment will be illustrated utilizing the TCP protocol as an example, it will be understood that the embodiment may be generally utilized with the sending of control messages on a control channel implemented with almost any protocol.

At step 1910 the method may commence at the expiration of a time interval. This may be a configurable (static or dynamically), may be a percentage of a measurement interval or configured in some other manner.

At step 1920, it can be determined if a STAT interval has elapsed. A STAT interval may be a measurement interval over which statistical data is collected and a STAT message sent. The STAT interval may be configurable either statically or dynamically during transmission of data, based on a variety of factors. In one embodiment, the STAT interval may be around 300 milliseconds.

If the STAT interval has elapsed at step 1920. A STAT message may be sent at step 1930 over the control channel. This STAT message may for example, include statistical data determined based on data from the determined during the STAT interval. This statistical data may include a network loss or network loss rate which may be a rate of packets determined to be lost during the STAT interval; a receive rate which is the number of packets or amount of data received over the STAT interval (which may be adjusted based on a previously determined receive rate); a receive count which is a count of the number of packets received over the STAT interval; a discard count which is the number of packets that had to discarded during the STAT interval because the staging buffer was full (as discussed above); and a duplicate count which is the number of packets received during the STAT interval that were previously received (as discussed above).

At step 1940 it can be determined if an ACK interval has elapsed. An ACK interval may be a measurement interval over which data on received packets (and, in some embodiments, packets which were not received) is collected and an ACK message sent. The ACK interval may be configurable either statically or dynamically during transmission of data, based on a variety of factors and may be the same or different than other measurement intervals such as the STAT interval. In one embodiment, the ACK interval may be around 450 milliseconds.

If the ACK interval has elapsed at step 1950, an ACK message may be sent over the control channel. This ACK message may, for example, include an ACK list of the sequence IDs (or ranges thereof) of packets received during the ACK interval. The ACK message may also include, a NACK list of the sequence IDs (or ranges thereof) of certain packets that were not received during the ACK interval. A NACK list may be determined, for example, by taking the lowest sequence ID of any packet received during the ACK interval and the highest sequence ID of any packet received during the ACK interval determining the sequence IDs for any packets that haven't been received that falls between the lowest sequence ID and the highest sequence ID. The remainder of the time interval may then be allowed to expire at step 1960 before the method is repeated.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system, comprising:
    a first computing device coupled to a second computing device over a computer network, the first computing device including:
    a processor; and
    a first protocol module including a set of instructions executing on the processor of the first computing device to:
        receive data for transmission;
        establish a control channel on the computer network with a second protocol module at a second computing device using a first protocol;
        establish a transmission channel on the computer network with the second protocol module at the second computing device using a second protocol;
        transmit data on the computer network to the second computing device over the transmission channel utilizing the second protocol;
        receive control data from the second protocol module at the second computing device over the control channel utilizing the first protocol, wherein the control data was determined at the second protocol module; and
    wherein the first protocol module further comprises a control module, and wherein the set of instructions executing on the processor of the first computing device includes adjusting, by the control module, the transmission of data on the transmission channel based on the received control data to reduce network latency associated with the transmission of data over the transmission channel utilizing the first second protocol.

2. The system of claim 1, wherein adjusting the transmission of data comprises:
    determining a send rate of data based on an operation environment; and adjusting, by a data rate module, the transmission of data on the transmission channel according to the send rate.

3. The system of claim 2, wherein the operational environment comprises an actual send rate associated with the first protocol module, an actual receive rate associated with the second protocol module, a perceived network drop rate associated with the second protocol module, reported duplicate packets associated with the second protocol module, reported dropped packets associated with the second protocol module, a discard rate, or a loss rate.

4. The system of claim 2, wherein the operational environment is determined according to a measurement interval.

5. The system of claim 4, wherein the adjusting transmission of the data is done based on the reception of control data over the control channel or the expiration of one or more measurement intervals.

6. The system of claim 1, wherein adjusting the transmission of data comprises prioritizing, by a sending module, one or more of a set of packets of the data for transmission on the transmission channel.

7. The system of claim 6, wherein prioritizing one or more of the set of packets of the data for transmission on the transmission channel includes assigning one or more of the set of packets reported as missing in the control data a highest priority.

8. The system of claim 7, wherein prioritizing one or more of the set of packets of the data for transmission on the transmission channel includes assigning one or more of the set of packets that have exceeded a retransmission time a next highest priority.

9. The system of claim 1, wherein the first protocol module is at a protocol layer above the first protocol in a protocol stack.

10. The system of claim 9, wherein the first protocol module emulates an interface provided by a third protocol and the data for transmission is received through the emulated interface.

11. The system of claim 10, wherein the third protocol is the same as the first protocol.

12. The system of claim 10, wherein the first protocol module resides between a session layer and a transport layer of the protocol stack.

13. The system of claim 1, wherein the set of instructions of the first protocol module includes instructions to determine that the second computing device does not have the second protocol module installed and send the second protocol module to the second computing device for installation at the second computing device.

14. The system of claim 1, wherein establishing a control channel and establishing a transmission channel comprise determining that the control channel or transmission channel cannot be established over a first port and establishing the control channel or transmission channel over a second port.

15. The system of claim 14, wherein control data transmitted over the control channel or data transmitted over the transmission channel is wrapped in a third protocol.

16. The system of claim 15, wherein the third protocol is the Hypertext Transfer Protocol (HTTP).

17. The system of claim 1, wherein the data for transmission is an entire file or a portion of a file.

18. The system of claim 17, wherein the set of instructions of the first protocol module includes instructions to, when the data is the portion of the file, accept a second portion of the file after the first portion of the file has been transmitted over the transmission channel, and transmitting the second portion of the file over the transmission channel after an acknowledgment of the first portion is received over the control channel.

19. The system of claim 1, wherein the first protocol is TCP and the second protocol is UDP.

* * * * *